United States Patent
Sloan et al.

(10) Patent No.: US 7,783,545 B2
(45) Date of Patent: Aug. 24, 2010

(54) AUTOMATED COACHING FOR A FINANCIAL MODELING AND COUNSELING SYSTEM

(75) Inventors: Ronald E. Sloan, Toronto (CA); Stephen B. Slutsky, Toronto (CA)

(73) Assignee: Accenture Global Services GmbH, Schaffhausen (CH)

( * ) Notice: Subject to any disclaimer, the term of this patent is extended or adjusted under 35 U.S.C. 154(b) by 0 days.

(21) Appl. No.: 09/976,443

(22) Filed: Oct. 12, 2001

(65) Prior Publication Data

US 2003/0144936 A1    Jul. 31, 2003

Related U.S. Application Data

(63) Continuation of application No. 09/705,255, filed on Nov. 1, 2000, now abandoned, and a continuation-in-part of application No. 09/431,417, filed on Nov. 1, 1999, now abandoned, and a continuation-in-part of application No. 09/580,352, filed on May 25, 2000, now abandoned.

(51) Int. Cl.
   *G06Q 40/00*  (2006.01)
(52) U.S. Cl. .................. 705/36; 705/35; 705/36 R; 705/37
(58) Field of Classification Search ............ 705/35, 705/36, 37, 36 R
   See application file for complete search history.

(56) References Cited

U.S. PATENT DOCUMENTS

| | | |
|---|---|---|
| 4,455,609 A | 6/1984 | Inamura et al. |
| 4,597,046 A | 6/1986 | Musmanno et al. |
| 4,822,647 A | 4/1989 | Nozaki et al. |
| 4,896,291 A | 1/1990 | Gest et al. |
| 4,953,085 A * | 8/1990 | Atkins ............ 705/36 R |
| 5,077,665 A | 12/1991 | Silverman et al. |
| 5,126,936 A | 6/1992 | Champion et al. |
| 5,132,899 A | 7/1992 | Fox |
| 5,136,501 A | 8/1992 | Silverman et al. |

(Continued)

FOREIGN PATENT DOCUMENTS

GB    2 192 567 A    1/1988

(Continued)

OTHER PUBLICATIONS

"Personal financial software", The CPA journal, New York, Sep. 1999, vol. 69, Iss.9; p. 40, 7 pgs, Proquest, describes numbers of software packages on the market for providing automated coaching for a finacial modeling.*

(Continued)

*Primary Examiner*—Nga B. Nguyen
(74) *Attorney, Agent, or Firm*—Finnegan, Henderson, Farabow, Garrett & Dunner LLP

(57) ABSTRACT

The present invention relates to an automated coaching system for financial modeling and counseling system. The automated coaching system enables the user to analyze the user's investment portfolio and dispense context sensitive automated advice to the user based on the user inputted financial data, preferences and financial goals. The automated coaching provides its advice to the user in syntactically correct natural language coaching strings and is able to configure and recommend solutions and financial products, specific to the user's situation. Furthermore, the automated coaching system can analyses the impact of the recommended product on the user's financial model.

17 Claims, 16 Drawing Sheets

U.S. PATENT DOCUMENTS

| | | | |
|---|---|---|---|
| 5,161,103 A | 11/1992 | Kosaka et al. | |
| 5,185,696 A | 2/1993 | Yoshino et al. | |
| 5,193,056 A | 3/1993 | Boes | |
| 5,214,579 A | 5/1993 | Wolfberg et al. | |
| 5,222,019 A | 6/1993 | Yoshino et al. | |
| 5,481,476 A | 1/1996 | Windig | |
| 5,615,109 A | 3/1997 | Eder | |
| 5,729,700 A | 3/1998 | Melnikoff | |
| 5,745,885 A | 4/1998 | Mottola et al. | |
| 5,761,442 A | 6/1998 | Barr et al. | |
| 5,774,663 A * | 6/1998 | Randle et al. | 709/204 |
| 5,774,878 A | 6/1998 | Marshall | |
| 5,774,880 A | 6/1998 | Ginsberg | |
| 5,774,883 A | 6/1998 | Andersen et al. | |
| 5,784,696 A | 7/1998 | Melnikoff | |
| 5,799,287 A | 8/1998 | Dembo | |
| 5,806,048 A | 9/1998 | Kiron et al. | |
| 5,806,049 A | 9/1998 | Petruzzi | |
| 5,809,484 A | 9/1998 | Mottola et al. | |
| 5,811,055 A | 9/1998 | Geiger | |
| 5,812,988 A | 9/1998 | Sandretto | |
| 5,819,237 A | 10/1998 | Garman | |
| 5,819,263 A * | 10/1998 | Bromley et al. | 707/3 |
| 5,826,250 A | 10/1998 | Trefler | |
| 5,852,811 A | 12/1998 | Atkins | |
| 5,857,176 A | 1/1999 | Ginsberg | |
| 5,864,828 A | 1/1999 | Atkins | |
| 5,870,550 A | 2/1999 | Wesinger, Jr. | |
| 5,873,071 A | 2/1999 | Ferstenberg et al. | |
| 5,875,437 A | 2/1999 | Atkins | |
| 5,884,287 A | 3/1999 | Edesess | |
| 5,893,079 A | 4/1999 | Cwenar | |
| 5,903,879 A | 5/1999 | Mitchell | |
| 5,911,135 A | 6/1999 | Atkins | |
| 5,911,136 A | 6/1999 | Atkins | |
| 5,913,202 A | 6/1999 | Motoyama | |
| 5,918,217 A * | 6/1999 | Maggioncalda et al. | 705/36 |
| 5,920,848 A | 7/1999 | Schutzer et al. | |
| 5,930,762 A | 7/1999 | Masch | |
| 5,930,774 A | 7/1999 | Chennault | |
| 5,940,812 A | 8/1999 | Tengel et al. | |
| 5,950,176 A | 9/1999 | Keiser et al. | |
| 5,963,625 A * | 10/1999 | Kawecki et al. | 379/127.01 |
| 5,963,925 A | 10/1999 | Kolling et al. | |
| 5,970,478 A | 10/1999 | Walker et al. | |
| 5,978,778 A | 11/1999 | O'Shaughnessy | |
| 5,987,433 A | 11/1999 | Crapo | |
| 5,987,434 A | 11/1999 | Libman | |
| 5,987,436 A | 11/1999 | Halbrook | |
| 5,999,918 A | 12/1999 | Williams et al. | |
| 6,003,018 A | 12/1999 | Michaud et al. | |
| 6,006,201 A | 12/1999 | Berent et al. | |
| 6,012,042 A | 1/2000 | Black et al. | |
| 6,012,043 A * | 1/2000 | Albright et al. | 705/36 |
| 6,012,044 A | 1/2000 | Maggioncalda et al. | |
| 6,018,722 A | 1/2000 | Ray et al. | |
| 6,018,768 A | 1/2000 | Ullman et al. | |
| 6,021,397 A * | 2/2000 | Jones et al. | 705/36 |
| 6,026,382 A | 2/2000 | Kalthoff | |
| 6,029,153 A | 2/2000 | Bauchner et al. | |
| 6,055,514 A * | 4/2000 | Wren | 705/27 |
| 6,055,517 A | 4/2000 | Friend | |
| 6,058,378 A | 5/2000 | Clark et al. | |
| 6,064,984 A | 5/2000 | Ferguson et al. | |
| 6,064,986 A | 5/2000 | Edelman | |
| 6,069,628 A | 5/2000 | Farry | |
| 6,078,904 A | 6/2000 | Rebane | |
| 6,081,768 A | 6/2000 | Hu | |
| 6,085,175 A | 7/2000 | Gugel et al. | |
| 6,112,181 A | 8/2000 | Shear et al. | |
| 6,119,103 A | 9/2000 | Basch et al. | |
| 6,125,355 A | 9/2000 | Bekaert et al. | |
| 6,151,582 A | 11/2000 | Huang et al. | |
| 6,186,793 B1 | 2/2001 | Brubaker | |
| 6,195,697 B1 | 2/2001 | Bowman-Amuah | |
| 6,230,197 B1 | 5/2001 | Beck et al. | |
| 6,233,566 B1 | 5/2001 | Levine et al. | |
| 6,236,972 B1 | 5/2001 | Shkedy | |
| 6,236,975 B1 | 5/2001 | Boe et al. | |
| 6,253,192 B1 | 6/2001 | Corlett et al. | |
| 6,256,773 B1 | 7/2001 | Bowman-Amuah | |
| 6,272,528 B1 | 8/2001 | Cullen et al. | |
| 6,275,807 B1 | 8/2001 | Schirripa | |
| 6,275,814 B1 | 8/2001 | Giansante et al. | |
| 6,282,520 B1 | 8/2001 | Schirripa | |
| 6,292,787 B1 | 9/2001 | Scott et al. | |
| 6,292,827 B1 | 9/2001 | Raz | |
| 6,307,958 B1 | 10/2001 | Deaton et al. | |
| 6,317,726 B1 | 11/2001 | O'Shaughnessy | |
| 6,324,523 B1 * | 11/2001 | Killeen et al. | 705/36 R |
| 6,327,586 B1 | 12/2001 | Kisiel | |
| 6,332,154 B2 | 12/2001 | Beck et al. | |
| 6,336,102 B1 | 1/2002 | Luskin et al. | |
| 6,349,290 B1 | 2/2002 | Horowitz et al. | |
| 6,360,210 B1 | 3/2002 | Wallman | |
| 6,370,355 B1 | 4/2002 | Ceretta et al. | |
| 6,370,508 B2 | 4/2002 | Beck et al. | |
| 6,375,466 B1 | 4/2002 | Juranovic | |
| 6,388,688 B1 | 5/2002 | Schileru-Key | |
| 6,393,409 B2 | 5/2002 | Young et al. | |
| 6,393,412 B1 | 5/2002 | Deep | |
| 6,405,179 B1 | 6/2002 | Rebane | |
| 6,408,225 B1 | 6/2002 | Ortmeier et al. | |
| 6,418,417 B1 | 7/2002 | Corby et al. | |
| 6,430,542 B1 * | 8/2002 | Moran | 705/36 |
| 6,470,325 B1 | 10/2002 | Leemhuis | |
| 6,477,447 B1 | 11/2002 | Lin | |
| 6,513,069 B1 | 1/2003 | Abato et al. | |
| 6,539,419 B2 | 3/2003 | Beck et al. | |
| 6,564,191 B1 | 5/2003 | Reddy | |
| 6,567,796 B1 | 5/2003 | Yost et al. | |
| 6,574,600 B1 | 6/2003 | Fishman et al. | |
| 6,601,044 B1 * | 7/2003 | Wallman | 705/36 R |
| 6,606,606 B2 | 8/2003 | Starr | |
| 6,615,240 B1 | 9/2003 | Sullivan | |
| 7,231,608 B1 | 6/2007 | Fano et al. | |
| 7,315,837 B2 | 1/2008 | Sloan et al. | |
| 7,401,040 B2 | 7/2008 | Sloan et al. | |
| 2001/0032207 A1 | 10/2001 | Hartley et al. | |
| 2001/0039493 A1 | 11/2001 | Pustejovsky et al. | |
| 2001/0044739 A1 | 11/2001 | Bensemana | |
| 2002/0046074 A1 | 4/2002 | Barton | |
| 2002/0087496 A1 | 7/2002 | Stirpe et al. | |
| 2002/0095363 A1 | 7/2002 | Sloan et al. | |
| 2002/0099613 A1 | 7/2002 | Swart et al. | |
| 2002/0147671 A1 | 10/2002 | Sloan et al. | |
| 2002/0161928 A1 | 10/2002 | Ndili | |

FOREIGN PATENT DOCUMENTS

| | | |
|---|---|---|
| GB | 2 192 567 A | 1/1998 |
| JP | 408086190 A | 4/1996 |
| JP | 100-93729 | 9/1996 |
| JP | 410093729 A | 9/1996 |
| JP | 411110447 A | 4/1999 |
| JP | 2000163030 A | 6/2000 |
| JP | 2000355290 A | 12/2000 |
| JP | 2001-209721 | 8/2001 |
| WO | WO 98/14902 A1 | 4/1998 |
| WO | WO 98/38558 A2 | 9/1998 |
| WO | WO 01/22253 A2 | 3/2001 |
| WO | WO 01/37187 | 5/2001 |

| | | |
|---|---|---|
| WO | WO0137187 | 5/2001 |

OTHER PUBLICATIONS

Press Release, "ZY.COM: ZY.com makes creating and publishing websites simple and Free for everyone", M2 Presswire; Coventry; Mar. 26, 1998, pp. 2, extracted on Internet on Oct. 29, 2001 from Proquest database [http://proquest.umi.com/pqdweb].
Dayco Statement Regarding Related Applications.
Glenn Kennedy et al, "Web to watch CAD companies online", from CADalyst, Sep. 1, 2000.
Rob Fanjogy, "New design software connects colleagues", from Professional Builder, Mar. 1, 1999.
Ouchi et al., "Handshake telephone system to communicate with voice and force", 1997, IEEE, pp. 466-471.
Sato et al., "Measuring system for grasping", 1996, IEEE, pp. 292-297.
Karlsson et al., "A glove equipped with finger flexion sensors as command generator used in fuzzy control system", 1998, IEEE, pp. 1330-1334.
"Sams Teach Yourself the Internet in 24 Hours," by Ned Snell, Sams Publishing, published Jun. 17, 1999, http://proquest.safaribooksonline.com/JVXSL.asp (last accessed on Jul. 21, 2005).
Office Action issued on Jul. 31, 2007 by US PTO on U.S. Appl. No. 09/929,610.
Office Action issued by EPO on Aug. 23, 2007 regarding summons to attend oral proceedings on Application No. 02765976.2-1238.
Office Action issued on Oct. 2, 2007 by US PTO on U.S. Appl. No. 09/927,560.
Akers, Robert L., Scifinance. (data processing in the securities industry), AI Magazine, Summer, 2001.
Kurt Chang, Solving pattern data exchange problems: standards development revived, From Bobbin, Oct. 1, 2000.
Cliff Currin, Financial Risk Management in Action. (petrochemicals industry), Chemical Week, Sep. 26, 2001.
Louis C. Gapenski, Debt-Maturity Structures Should Match Risk Preferences, (statistical data included), Healthcare Financial Management Dec. 1999.
Don N. Kleinmuntz, Measuring and managing risk improves strategic financial Planning, Healthcare Financial Management, Jun. 1999.
Dean Villegas, WHIP! Your AutoCAD drawings, From CADalyst, Feb. 1, 1998.
Office Action issued Oct. 23, 2007 by EPO on European Application No. P11996EP/SSA.
Office Action issued on Oct. 31, 2007 by US PTO on U.S. Appl. No. 09/930,786.
Office Action issued on Nov. 30, 2007 by US PTO on U.S. Appl. No. 09/704,838.
Office Action issued on Jan. 4, 2008 by US PTO on U.S. Appl. No. 09/929,610.
Office Action issued on Feb. 8, 2008 by US PTO on U.S. Appl. No. 09/927,560.
Office Action issued Jan. 31, 2008 by EPO on Application No. 00959 864.0.
Office Action issued on Feb. 15, 2008 by US PTO on U.S. Appl. No. 09/930,786.
Office Action issued on Apr. 3, 2008 by US PTO on U.S. Appl. No. 09/927,560.
Office Action issued Oct. 23, 2007 by EPO on European Application No. 02 802 758.9-2221.
Office Action issued on Jul. 25, 2008 by US PTO on U.S. Appl. No. 09/930,786.
Star, B., U.S. Appl. No. 60/107,731 filed Nov. 9, 1998.
"GE Center for Financial Learning; Planning Tools, 'How Much Am I Spending?'" Internet Article, Online! 1999-2000. Retrieved from the Internet: www.financiallearning.com/ge/calculator.jsp?oid=9705&BV_SessionID=@@@@1126282150.1003 930066@@@@&BV_EngineID=cadccfkmghkgbedcgceckh.0> on Oct. 24, 2001; 3 pgs.
Bacchus, F. et al. "Planning for Temporally Extended Goals" 13th International Conference on AI, Portland, OR, 1996; AAAI-96 Proceedings, pp. 1215-1222.
Bellone, R. "Forecast Your Clients' Financial Future" Accounting Technology, vol. 12, No. 3, 1996. Retrieved from the Internet: http://proquest.umi.com on Jun. 19, 2002; 6 pgs.
Booker, E. "A Think-Tank Vision" Internetweek.com, Sep. 10, 1999. Retrieved from the Internet: www.internetwk.com, 3 pgs.
Campbell, T. "Get Plugged In: Service with a :-)" Sales and Marketing Management, vol. 151, Issue 3, Mar. 1999; pp. 62-68. Retrieved from the Internet: http://proquest.umi.com on Mar. 4, 2003.
Carey, T. "Putting the Brains in Your PC" Barrons, vol. 78, Issue 49, 1998. Retrieved from the Internet: http://proquest.umi.com on Jun. 18, 2002; 4 pgs.
Dayco Statement Regarding Related Applications filed in U.S. Appl. No. 09/520,580 on Nov. 26, 2003.
Deb, K. "Solving Goal Programming Problems Using Multi-Objective Genetic Algorithms" Proceedings of the Congress on Evolutionary Computing, Jul. 6-9, 1999; pp. 77-84.
Epstein, E. "Converging Future" Info World News, Jan. 7, 2000. Retrieved from the Internet: http://sandbox.xerox.com, 8 pgs.
European Patent Application No. 00976918.3 (Publication No. EP 1228470), Communication pursuant to Article 96(2) EPC, with Annex to the communication; Date: Oct. 24, 2002.
European Patent Application No. 00991933.3 (Publication No. EP 1228473), Communication pursuant to Article 94(3) EPC, with Annex to the communication; Date: Feb. 16, 2009.
European Patent Application No. 01927371.3 (Publication No. EP 1269386), Communication pursuant to Article 96(2), with Annex to the communication; Date: Jun. 5, 2003.
European Patent Application No. 01927371.3 (Publication No. EP 1269386), Decision to refuse a European Patent Application, with Annex to the communication; Date: Mar. 17, 2005.
European Patent Application No. 01927371.3 (Publication No. EP 1269386), Minutes of the oral proceedings before the Examining Division; Date of Proceedings: Feb. 17, 2005, Date of Minutes: Mar. 17, 2005.
European Patent Application No. 01927371.3 (Publication No. EP 1269386), Summons to attend oral proceedings, with Annex to the communication; Date: Oct. 27, 2004.
European Patent Application No. 02759326.8 (Publication No. EP 1419468), Communication pursuant to Article 96(2) EPC, with Annex to the communication; Date: Sep. 19, 2005.
European Patent Application No. 02759326.8 (Publication No. EP 1419468), Minutes of the oral proceedings before the Examining Division, with Annex to the communication; Date of Proceedings: Nov. 4, 2009, Date of Minutes: Dec. 10, 2009.
European Patent Application No. 02759326.8 (Publication No. EP 1419468), Summons to attend oral proceedings, with Annex to the communication; Date: Jan. 28, 2009.
European Patent Application No. 02765975.4 (Publication No. EP 1423772), Supplementary Search Report; Date of Mailing: Aug. 2, 2006.
European Patent Application No. 02765976.2 (Publication No. EP 1423813), Communication pursuant to Article 96(2) EPC, with Annex to the communication; Date: Feb. 10, 2005.
European Patent Application No. 02765976.2 (Publication No. EP 1423813), Communication regarding the declaration under Rule 45 EPC, with Annex to the communication; Date: Jul. 1, 2004.
European Patent Application No. 02765976.2 (Publication No. EP 1423813), Decision to refuse a European Patent application; Date: Jan. 21, 2008.
European Patent Application No. 02765976.2 (Publication No. EP 1423813), Minutes of the oral proceedings before the Examining Division, with Annexes to the communication; Date of Proceedings: Nov. 27, 2007; Date of Minutes: Jan. 21, 2008.
European Patent Application No. 02765976.2 (Publication No. EP 1423813), Result of consultation of Nov. 19, 2007 with Annex to the communication; Date: Nov. 23, 2007.
European Patent Application No. 02794694.6 (Publication No. EP 1423815), Communication pursuant to Article 96(2) EPC, with Annex to the communication; Date: Jul. 20, 2006.
European Patent Application No. 02794694.6 (Publication No. EP 1423815), Communication regarding the declaration under Rule 45 EPC, with Annex to the Communication; Date: Oct. 29, 2004.

European Patent Application No. 02802758.9 (Publication No. EP 1435033), Communication regarding the declaration under Rule 45 EPC, with Annex to the communication; Date: Mar. 27, 2006.

European Patent Application No. 02802758.9 (Publication No. EP 1435033), Minutes of the oral proceedings before the Examining Division, with Annexes to the communication; Date of Proceedings: Jun. 17, 2009, Date of Minutes: Jun. 30, 2009.

European Patent Application No. 02802758.9 (Publication No. EP 1435033), Summons to attend oral proceedings, with Annex to the communication; Date: Mar. 5, 2009.

European Patent Application No. EP 01927370.5 (Publication No. EP 1264245), Communication pursuant to Article 96(2) EPC, with Annex to the communication; Date: Aug. 6, 2007.

Fano, A.E. "A Strategy-Based Theory of Planning for Goal-Based Scenario-Learning Environments" *Dissertation Abstracts International*, vol. 57, Issue 11-B, 1996. Retrieved from Dialog, File 35: Dissertation Abs Online, 1 pg.

Fano, A.E. "Shoppers Eye: Using Location-based Filtering for a Shopping Agent in the Physical World" Proceedings of the 2nd International Conference on Autonomous Agents, May 9-13, 1998. Retrieved from Dialog, File 2: INSPEC, 2 pgs.

Fischer, D.E. et al. *Security Analysis and Portfolio Management*. Fifth Edition. Prentice-Hall, Inc., New Jersey, 1991; pp. 89-158.

International Patent Application No. PCT/US00/30389 (Publication No. WO 01/33467), Declaration of Non-Establishment of International Search Report Under PCT Article 17(2)(a); Date of Mailing: Sep. 18, 2001.

International Patent Application No. PCT/US00/30389 (Publication No. WO 01/33467), International Preliminary Examination Report; Date of Completion: Aug. 15, 2002.

International Patent Application No. PCT/US00/30423 (Publication No. WO 01/33402), Declaration of Non-Establishment of International Search Report Under PCT Article 17(2)(a); Date of Mailing: Nov. 5, 2001.

International Patent Application No. PCT/US00/30423 (Publication No. WO 01/33402), International Preliminary Examination Report; Date of Completion: Sep. 14, 2003.

International Patent Application No. PCT/US00/41850 (Publication No. WO 01/37187), Declaration of Non-Establishment of International Search Report Under PCT Article 17(2)(a); Date of Mailing: Feb. 5, 2002.

International Patent Application No. PCT/US00/41850 (Publication No. WO 01/37187), International Preliminary Examination Report; Date of Completion: Sep. 7, 2002.

International Patent Application No. PCT/US00/41852 (Publication No. WO 01/33474), Declaration of Non-Establishment of International Search Report Under PCT Article 17(2)(a); Date of Mailing: Sep. 25, 2001.

International Patent Application No. PCT/US00/41852 (Publication No. WO 01/33474), International Preliminary Examination Report; Date of Completion: Jul. 26, 2002.

International Patent Application No. PCT/US00/41855 (Publication No. WO 01/67334), Declaration of Non-Establishment of International Search Report Under PCT Article 17(2)(a); Date of Mailing: Aug. 23, 2001.

International Patent Application No. PCT/US00/41855 (Publication No. WO 01/67334), International Preliminary Examination Report; Date of Completion: Feb. 10, 2002.

International Patent Application No. PCT/US00/41872 (Publication No. WO 01/33476), Declaration of Non-Establishment of International Search Report Under PCT Article 17(2)(a); Date of Mailing: May 28, 2003.

International Patent Application No. PCT/US00/41872 (Publication No. WO 01/33476), International Preliminary Examination Report; Date of Completion: Apr. 8, 2005.

International Patent Application No. PCT/US01/40213 (Publication No. WO 01/65907), Declaration of Non-Establishment of International Search Report Under PCT Article 17(2)(a); Date of Mailing: Jun. 15, 2001.

International Patent Application No. PCT/US01/40213 (Publication No. WO 01/65907), International Preliminary Examination Report; Date of Completion: Oct. 16, 2003.

International Patent Application No. PCT/US01/40213 (Publication No. WO 01/65907), Written Opinion; Date of Mailing: Apr. 4, 2003.

International Patent Application No. PCT/US01/40214 (Publication No. WO 01/67340), International Preliminary Examination Report; Date of Completion: Jul. 28, 2002.

International Patent Application No. PCT/US01/40214 (Publication No. WO 01/67340), International Search Report; Date of Mailing: Nov. 9, 2001.

International Patent Application No. PCT/US02/25488 (Publication No. WO 03/17040), International Preliminary Examination Report; Date of Completion: May 19, 2004.

International Patent Application No. PCT/US02/25488 (Publication No. WO 03/17040), International Search Report; Date of Mailing: Jun. 23, 2003.

International Patent Application No. PCT/US02/25489 (Publication No. WO 03/14884), International Preliminary Examination Report; Date of Completion: Jul. 2, 2003.

International Patent Application No. PCT/US02/25489 (Publication No. WO 03/14884), International Search Report; Date of Mailing: Mar. 6, 2003.

International Patent Application No. PCT/US02/25491 (Publication No. WO 03/17041), International Preliminary Examination Report; Date of Completion: Jun. 26, 2003.

International Patent Application No. PCT/US02/25491 (Publication No. WO 03/17041), International Search Report; Date of Mailing: May 29, 2003.

International Patent Application No. PCT/US02/25492 (Publication No. WO 03/39227), International Preliminary Examination Report; Date of Completion: Nov. 2, 2003.

International Patent Application No. PCT/US02/25492 (Publication No. WO 03/39227), International Search Report; Date of Mailing: Aug. 18, 2003.

International Patent Application No. PCT/US02/25500 (Publication No. WO 01/17168), Declaration of Non-Establishment of International Search Report Under PCT Article 17(2)(a); Date of Mailing: Apr. 22, 2003.

International Patent Application No. PCT/US02/25500 (Publication No. WO 01/17168), International Preliminary Examination Report; Date of Completion: Jan. 12, 2004.

Intuit Press Release, "CNNfn.com and Intuit Announce Quicken. com on Fn, the Premier Personal Financial Resource on the Web" Dec. 2, 1997; 2 pgs.

Jaffe, L.A. "Quicken Financial Planner" Harvard Computer Review vol. 14, No. 1, Apr. 1997.

Meahdra, M. The ABC's of Netscape Composer Sybex, SanFransisco-Paris-Dusseldorf-Soest, 1997; pg. 15, 66.

Mortenson, P. "Financial Planning by Computer" *Best's Review (Life+/Health)*, vol. 85, No. 2, 1984; pgs. 38, 40.

Nelson, S.L. *Quicken 98 for Windows for Dummies*. IDG Books Worldwide, Inc., 1998. Table of Contents, 15 pgs.

Office Action issued in U.S. Appl. No. 09/430,993; Date Mailed: Aug. 29, 2002.

Office Action issued in U.S. Appl. No. 09/431,389; Date Mailed: Nov. 7, 2001.

Office Action issued in U.S. Appl. No. 09/431,394; Date Mailed: Jul. 15, 2002.

Office Action issued in U.S. Appl. No. 09/431,417; Date Mailed: Jun. 15, 2001.

Office Action issued in U.S. Appl. No. 09/431,668; Date Mailed: May 24, 2002.

Office Action issued in U.S. Appl. No. 09/431,684, Restriction Requirement; Mail Date: Jul. 8, 2002.

Office Action issued in U.S. Appl. No. 09/431,684; Date Mailed: Sep. 9, 2002.

Office Action issued in U.S. Appl. No. 09/451,596, Restriction Requirement; Mail Date: Jun. 27, 2002.

Office Action issued in U.S. Appl. No. 09/451,667, Restriction Requirement; Mail Date: Jun. 27, 2002.

Office Action issued in U.S. Appl. No. 09/451,670; Date Mailed: Oct. 23, 2001.

Office Action issued in U.S. Appl. No. 09/451,675; Date Mailed: Aug. 2, 2002.

Office Action issued in U.S. Appl. No. 09/452,273, Restriction Requirement; Date Mailed: Jul. 23, 2002.
Office Action issued in U.S. Appl. No. 09/452,273; Date Mailed: Aug. 29, 2002.
Office Action issued in U.S. Appl. No. 09/452,276; Date Mailed: Jul. 18, 2002.
Office Action issued in U.S. Appl. No. 09/452,280; Date Mailed: Sep. 19, 2002.
Office Action issued in U.S. Appl. No. 09/520,564; Date Mailed: Apr. 14, 2003.
Office Action issued in U.S. Appl. No. 09/520,564; Date Mailed: Jul. 1, 2002.
Office Action issued in U.S. Appl. No. 09/520,580, Advisory Action; Date Mailed: Feb. 9, 2005.
Office Action issued in U.S. Appl. No. 09/520,580, Advisory Action; Date Mailed: Aug. 6, 2003.
Office Action issued in U.S. Appl. No. 09/520,580, Advisory Action; Date Mailed: Oct. 6, 2004.
Office Action issued in U.S. Appl. No. 09/520,580, Notice of Allowance; Date Mailed: Dec. 1, 2005.
Office Action issued in U.S. Appl. No. 09/520,580; Date Mailed: Mar. 12, 2003.
Office Action issued in U.S. Appl. No. 09/520,580; Date Mailed: Jun. 16, 2004.
Office Action issued in U.S. Appl. No. 09/520,580; Date Mailed: Jul. 25, 2002.
Office Action issued in U.S. Appl. No. 09/520,580; Date Mailed: Dec. 4, 2003.
Office Action issued in U.S. Appl. No. 09/520,600; Date Mailed: Sep. 26, 2002.
Office Action issued in U.S. Appl. No. 09/520,938; Date Mailed: Feb. 19, 2003.
Office Action issued in U.S. Appl. No. 09/520,940; Advisory Action; Date Mailed: Jul. 12, 2004.
Office Action issued in U.S. Appl. No. 09/520,940; Decision on Appeal by the Board of Patent Appeals and Interferences; Decided: Apr. 23, 2007.
Office Action issued in U.S. Appl. No. 09/520,940; Date Mailed: Jan. 30, 2004.
Office Action issued in U.S. Appl. No. 09/520,940; Date Mailed: Feb. 25, 2003.
Office Action issued in U.S. Appl. No. 09/520,940; Date Mailed: Apr. 8, 2005.
Office Action issued in U.S. Appl. No. 09/520,940; Date Mailed: Jun. 25, 2002.
Office Action issued in U.S. Appl. No. 09/520,940; Date Mailed: Aug. 26, 2003.
Office Action issued in U.S. Appl. No. 09/520,940; Date Mailed: Oct. 5, 2004.
Office Action issued in U.S. Appl. No. 09/520,940; Examiners Answer before the Board of Patent Appeals and Interferences; Date Mailed: Mar. 21, 2006.
Office Action issued in U.S. Appl. No. 09/520,943, Examiner Interview Summary; Date Mailed: Sep. 19, 2006.
Office Action issued in U.S. Appl. No. 09/520,943, Examiners Answer Before the Board of Patent Appeals and Interferences; Date Mailed: Sep. 26, 2006.
Office Action issued in U.S. Appl. No. 09/520,943, Examiners Answer Before the Board of Patent Appeals and Interferences; Date Mailed: Nov. 7, 2005.
Office Action issued in U.S. Appl. No. 09/520,943; Advisory Action; Date Mailed: Mar. 12, 2004.
Office Action issued in U.S. Appl. No. 09/520,943; Decision on Appeal Before the Board of Patent Appeals and Interferences, Appeal No. 2007-0868; Decided: Feb. 28, 2008.
Office Action issued in U.S. Appl. No. 09/520,943; Date Mailed: Jan. 6, 2009.
Office Action issued in U.S. Appl. No. 09/520,943; Date Mailed: Jan. 13, 2005.
Office Action issued in U.S. Appl. No. 09/520,943; Date Mailed: Mar. 11, 2003.
Office Action issued in U.S. Appl. No. 09/520,943; Date Mailed: Jul. 8, 2009.
Office Action issued in U.S. Appl. No. 09/520,943; Date Mailed: Jul. 14, 2008.
Office Action issued in U.S. Appl. No. 09/520,943; Date Mailed: Jul. 19, 2004.
Office Action issued in U.S. Appl. No. 09/520,943; Date Mailed: Nov. 18, 2003.
Office Action issued in U.S. Appl. No. 09/520,943; Examiner Interview Summary; Date Mailed: Oct. 20, 2009.
Office Action issued in U.S. Appl. No. 09/520,944; Date Mailed: Mar. 14, 2003.
Office Action issued in U.S. Appl. No. 09/521,470; Date Mailed: Apr. 23, 2003.
Office Action issued in U.S. Appl. No. 09/579,849; Date Mailed: Jul. 25, 2003.
Office Action issued in U.S. Appl. No. 09/579,852; Date Mailed: Mar. 25, 2003.
Office Action issued in U.S. Appl. No. 09/579,853; Date Mailed: Oct. 15, 2002.
Office Action issued in U.S. Appl. No. 09/579,854; Date Mailed: Dec. 18, 2002.
Office Action issued in U.S. Appl. No. 09/580,214; Date Mailed: Feb. 4, 2003.
Office Action issued in U.S. Appl. No. 09/580,273, Restriction Requirement; Date Mailed: Sep. 8, 2003.
Office Action issued in U.S. Appl. No. 09/580,273; Date Mailed: Apr. 5, 2005.
Office Action issued in U.S. Appl. No. 09/580,276; Date Mailed: Dec. 18, 2002.
Office Action issued in U.S. Appl. No. 09/580,349; Date Mailed: Jul. 25, 2003.
Office Action issued in U.S. Appl. No. 09/580,350; Date Mailed: Jul. 24, 2003.
Office Action issued in U.S. Appl. No. 09/580,351; Date Mailed: Dec. 3, 2002.
Office Action issued in U.S. Appl. No. 09/580,352; Date Mailed: Jul. 8, 2002.
Office Action issued in U.S. Appl. No. 09/580,353; Date Mailed: Jul. 30, 2003.
Office Action issued in U.S. Appl. No. 09/580,508; Date Mailed: Jul. 15, 2003.
Office Action issued in U.S. Appl. No. 09/580,509; Date Mailed: Feb. 27, 2002.
Office Action issued in U.S. Appl. No. 09/584,165, Restriction Requirement; Date Mailed: Jul. 29, 2003.
Office Action issued in U.S. Appl. No. 09/584,165; Date Mailed: Oct. 8, 2003.
Office Action issued in U.S. Appl. No. 09/704,838, Examiner Interview Summary; Date Mailed: Feb. 8, 2008.
Office Action issued in U.S. Appl. No. 09/704,838; Date Mailed: Dec. 9, 2009.
Office Action issued in U.S. Appl. No. 09/704,838; Date Mailed: Feb. 6, 2004.
Office Action issued in U.S. Appl. No. 09/704,838; Date Mailed: Mar. 9, 2006.
Office Action issued in U.S. Appl. No. 09/704,838; Date Mailed: Apr. 22, 2009.
Office Action issued in U.S. Appl. No. 09/704,838; Date Mailed: May 5, 2008.
Office Action issued in U.S. Appl. No. 09/704,838; Date Mailed: May 27, 2009.
Office Action issued in U.S. Appl. No. 09/704,838; Date Mailed: Jul. 13, 2007.
Office Action issued in U.S. Appl. No. 09/704,838; Date Mailed: Aug. 1, 2005.
Office Action issued in U.S. Appl. No. 09/704,838; Date Mailed: Oct. 20, 2006.
Office Action issued in U.S. Appl. No. 09/704,838; Date Mailed: Oct. 30, 2008.
Office Action issued in U.S. Appl. No. 09/927,560; Date Mailed: May 2, 2007.
Office Action issued in U.S. Appl. No. 09/927,560; Date Mailed: Aug. 25, 2006.

Office Action issued in U.S. Appl. No. 09/929,610, Examiner Interview Summary; Date Mailed: Jun. 3, 2009.
Office Action issued in U.S. Appl. No. 09/929,610; Date Mailed: Mar. 4, 2009.
Office Action issued in U.S. Appl. No. 09/929,610; Date Mailed: Mar. 21, 2007.
Office Action issued in U.S. Appl. No. 09/929,610; Date Mailed: Aug. 20, 2008.
Office Action issued in U.S. Appl. No. 09/929,610; Date Mailed: Aug. 25, 2006.
Office Action issued in U.S. Appl. No. 09/929,735, Advisory Action; Date Mailed: Sep. 14, 2005.
Office Action issued in U.S. Appl. No. 09/929,735, Examiner Interview Summary; Date Mailed: Jun. 29, 2007.
Office Action issued in U.S. Appl. No. 09/929,735, Examiner Interview Summary; Date Mailed: Nov. 22, 2004.
Office Action issued in U.S. Appl. No. 09/929,735, Notice of Allowance with Examiner Interview Summary; Date Mailed: Feb. 15, 2007.
Office Action issued in U.S. Appl. No. 09/929,735, Notice of Allowance; Date Mailed: Apr. 30, 2007.
Office Action issued in U.S. Appl. No. 09/929,735; Date Mailed: Oct. 19, 2004.
Office Action issued in U.S. Appl. No. 09/929,735; Date Mailed: Jan. 31, 2006.
Office Action issued in U.S. Appl. No. 09/929,735; Date Mailed: Mar. 5, 2004.
Office Action issued in U.S. Appl. No. 09/929,735; Date Mailed: Mar. 17, 2003.
Office Action issued in U.S. Appl. No. 09/929,735; Date Mailed: Jun. 27, 2006.
Office Action issued in U.S. Appl. No. 09/929,735; Date Mailed: Jul. 6, 2005.
Office Action issued in U.S. Appl. No. 09/929,735; Date Mailed: Sep. 24, 2003.
Office Action issued in U.S. Appl. No. 09/930,786, Notice of Allowance with Examiner Interview Summary; Date Mailed: Jun. 24, 2009.
Office Action issued in U.S. Appl. No. 09/930,786, Notice of Allowance; Date Mailed: Nov. 12, 2009.
Office Action issued in U.S. Appl. No. 09/930,786; Date Mailed: Feb. 3, 2009.
Office Action issued in U.S. Appl. No. 09/930,786; Date Mailed: Jun. 16, 2005.
Office Action issued in U.S. Appl. No. 09/930,786; Date Mailed: Jul. 25, 2008.
Office Action issued in U.S. Appl. No. 09/930,786; Date Mailed: Jul. 27, 2004.
Office Action issued in U.S. Appl. No. 09/930,786; Date Mailed: Nov. 18, 2004.
Office Action issued in U.S. Appl. No. 09/930,786; Date Mailed: Dec. 18, 2003.
Palma-Dos-Reis, A. "Designing Personalized Intelligent Financial Decision Support Systems" *Decision Support Systems*, vol. 26, 1999; pp. 31-47.
Press release, "Kana and Webline Team to Provide Industry's Most Comprehensive Online Customer Interaction Solution"; Business Wire; New York; Apr. 20, 1999, pp. 1-3, extracted on Internet from http://proquest.umi.com on Mar. 4, 2003.
Press Release, "Webline Communications' Products Selected By Trimark Investments To Increase Service On financial Advis . . . Web Site"; Business Wire; Mar. 22, 1999, extracted on Internet from Dialog database on Feb. 26, 2003.
Press Release, "Webline Communications Unveils New Customer Interaction Software Suite for Enabling Interactive E-Commerce and Customer Service", Business Wire; New York; Apr. 20, 1999, pp. 1-3.
Press Release, "Webline Communications Unveils New Customer Interaction Software Suite for Enabling Interactive E-Commerce and Customer Service", Business Wire; New York; Aug 16, 1999, pp. 1-4, extracted on Internet from http://proquest.umi.com on Mar. 4, 2003.
Probst, G. "Gerez Votre Budget Familial Sur FX—702 P" Micro-Systemes, Apr. 1983; pp. 133, 135, with English abstract. Abstract.
Rachlin, R. et al. *Accounting and Financial Fundamentals for Nonfinancial Executives*. Rachlin, R. and Sweeny, H.W.A. (eds.), AMACOM, New York, 1972; pp. 139-143.
Reeves, J. "Growing Your Practice Beyond Financial Planning: The CPA as Investment Adviser" *CPA Journal*, Sep., 1998, pp. 46-52.
Texas Instruments TI-89 Advanced Graphing Calculator, from http://www.amazon.com, hard-copy printed Mar. 18, 2003 (excerpts: Table of Contents, Chapter 16, and Chapter 23); 56 pages.
TI-89 and Voyage™ 200PLT product guide, and TI-89/92 Plus Graphing Calculator Tasks (copyright 1995-2003) (excerpts); 158 pages.
Waldron, H.C. "The Game of Life" *LIMRA's Marketfacts*, vol. 16, Issue 5, Sep./Oct. 1997. Retrieved from the Internet: http://proquest.umi.com on Jun. 17, 2002, 5 pgs.
Waller, K.M. "Filling the Knowledge Gap" *Journal of Accountancy*, vol. 187, Issue 4, 1999. Retrieved from the Internet: http://proquest.umi.com on Jun. 21, 2002, 5 pgs.
Weverka, P. *Microsoft Money 98 for Dummies*. IDG Books Worldwide, Inc., Foster City, CA, 1997; pp. 21-29, 59-79, 149-161, and 207-229.
Williams, D.C. "Automating a Financial Planning Service" *ABA Banking Journal*, vol. 77, No. 10, 1985; pp. 82, 84.
www.runmoney.com, May 2000, downloaded from Internet on Jan. 19, 2001.
Das, S. "Increasing Agent Autonomy by Learning From Events" PADD98; 2nd Int'l. Conf. on the Practical application of Knowledge Discovery and Data Mining; London, UK, 1998; pp. 241-260.
Office Action issued in U.S. Appl. No. 09/431,390; Date Mailed: Oct. 24, 2001 (as indicated on the USPTO file wrapper table of contents).
Office Action issued in U.S. Appl. No. 09/520,943; Date Mailed: Mar. 3, 2010.
Office Action issued in U.S. Appl. No. 09/930,786, Notice of Allowance; Date Mailed: Feb. 19, 2010.
Office Action issued in U.S. Appl. No. 09/704,838, Notice of Allowance; Date Mailed: Jun. 15, 2010.
Office Action issued in U.S. Appl. No. 09/929,610, Notice of Allowability; Date Mailed: May 26, 2010.
Office Action issued in U.S. Appl. No. 09/929,610, Notice of Allowance; Date Mailed: Apr. 5, 2010.
Office Action issued in U.S. Appl. No. 09/930,786, Notice of Allowance; Date Mailed: Apr. 19, 2010.

* cited by examiner

AUTOMATED COACHING FOR A FINANCIAL MODELING AND COUNSELING SYSTEM

CROSS REFERENCE TO RELATED APPLICATIONS

The present application is a continuation of a parent application Ser. No. 09/705,255, filed Nov. 1, 2000 now abandoned, entitled "AUTOMATED COACHING FOR A FINANCIAL MODELING AND COUNSELING SYSTEM", of the assignee of the present invention, incorporated herein by reference.

Furthermore, the present application is a continuation-in-part of U.S. application Ser. No. 09/431,417 entitled "SYSTEM, METHOD AND ARTICLE OF MANUFACTURE FOR AN ADVICE GENERATING SUBSYSTEM IN A FINANCIAL MANAGEMENT AND ADVICE GENERATING INFORMATION" filed Nov. 1, 1999 now abandoned, and U.S. application Ser. No. 09/580,352 entitled "SYSTEM, METHOD AND ARTICLE OF MANUFACTURE FOR PERFORMING A RISK ANALYSIS USING A NETWORK-BASED PERSONAL INVESTMENT MANAGER" filed May 25, 2000 now abandoned both of which we incorporated herein by reference.

FIELD OF INVENTION

The present invention relates generally to computerized information systems and more particularly to web-enabled computer implemented financial modeling systems.

BACKGROUND OF THE INVENTION

Financially prudent individuals help develop financial plans that will aid them in achieving their financial goals. More recently, some individuals have increasingly relied upon computer-based systems that organize their financial assets and liabilities and further provide them with a summary of their financial health. However, these systems tend to focus on the administrative aspects of financial planning without enabling the user to make reasoned choices about their financial futures. To do so the user needs a financial tool that approaches modeling from an executive decision-making perspective.

Traditionally, individuals investors had to rely on an investment advisor to manage their investment portfolio. Although an investment advisor is a valuable ingredient in helping the user achieve his prospective financial goals, investment advisors can be very expensive. In fact, investors who traditionally use a personal fund manager or advisor generally have portfolios in excess of several million dollars. An advisor spends a great deal of his expensive time in ascertaining the user's goals, market attitude, preferences and risk tolerance. The advisor then accumulates all the financial information regarding the user and model his investment portfolio. A thorough investigation is required in order to dispense good advice taking the user's tax liability, life style, expenses or unforeseen events into account as well as the user's financial goals. This process is expensive and thus an unavailable option for the majority of investors.

Furthermore, the availability and access to a human advisor may be less than ideal. A human advisor need sleep, get sick, takes vacations, etc.

In view of the forgoing, systems and computer methods are needed to automate many of the functions traditionally performed by live advisors. Automated financial coaching would therefore reduce costs, and make financial advising more accessible to individuals of more modest means.

SUMMARY OF THE INVENTION

The present invention provides automated coaching to a user within the framework of a financial counseling and modeling system. The automated coaching alerts and focuses the user attention to the issues to be addressed, and frames decisions to be made. The automated coaching helps focus the user's attention to specific problems and in many cases is able to provide specific solutions to those problems. The automated coach uses natural language coaching strings to dispense its analysis to the user.

In general terms, the present invention relates to a financial management system for providing personalized financial advice to a user. A service level subsystem allows the user to negotiate a service level agreement that defines the user's desired level of support and limits access to user provided information. The modeling subsystem aggregates the user's financial information such as the user revenue and expense expectation over a defined period of time. The advice generating subsystem is coupled to the service level subsystem and includes one or more coaching engines that dynamically analyze the financial needs of the user in accordance with the user's inputted financial and investment profile. Furthermore, the automated coaching engine provides customized financial coaching tailored to the user's life intentions.

Furthermore, the financial modeling and counseling system models the user's investment portfolio. The model develops a profile based on the user's personal investment parameters and provides him with automated customized coaching to help the user better conform his investment portfolio to his investment profile. The automated coaching further analyses the user's investment portfolio, and offers customized coaching to improve the user investment portfolio growth while reducing its financial risk. The present invention further benchmarks the user's portfolio against market indices and projects its prospective performance based on the user's profile and his targeted goals.

These and other advantages of the present invention will be apparent upon a study of the following descriptions and drawings.

BRIEF DESCRIPTION OF THE DRAWINGS

The foregoing and other aspects and advantages are better understood from the following detailed description of a preferred embodiment of the invention with reference to the drawings, in which.

DETAILED DESCRIPTION OF THE PREFERRED EMBODIMENTS

Figure 1:
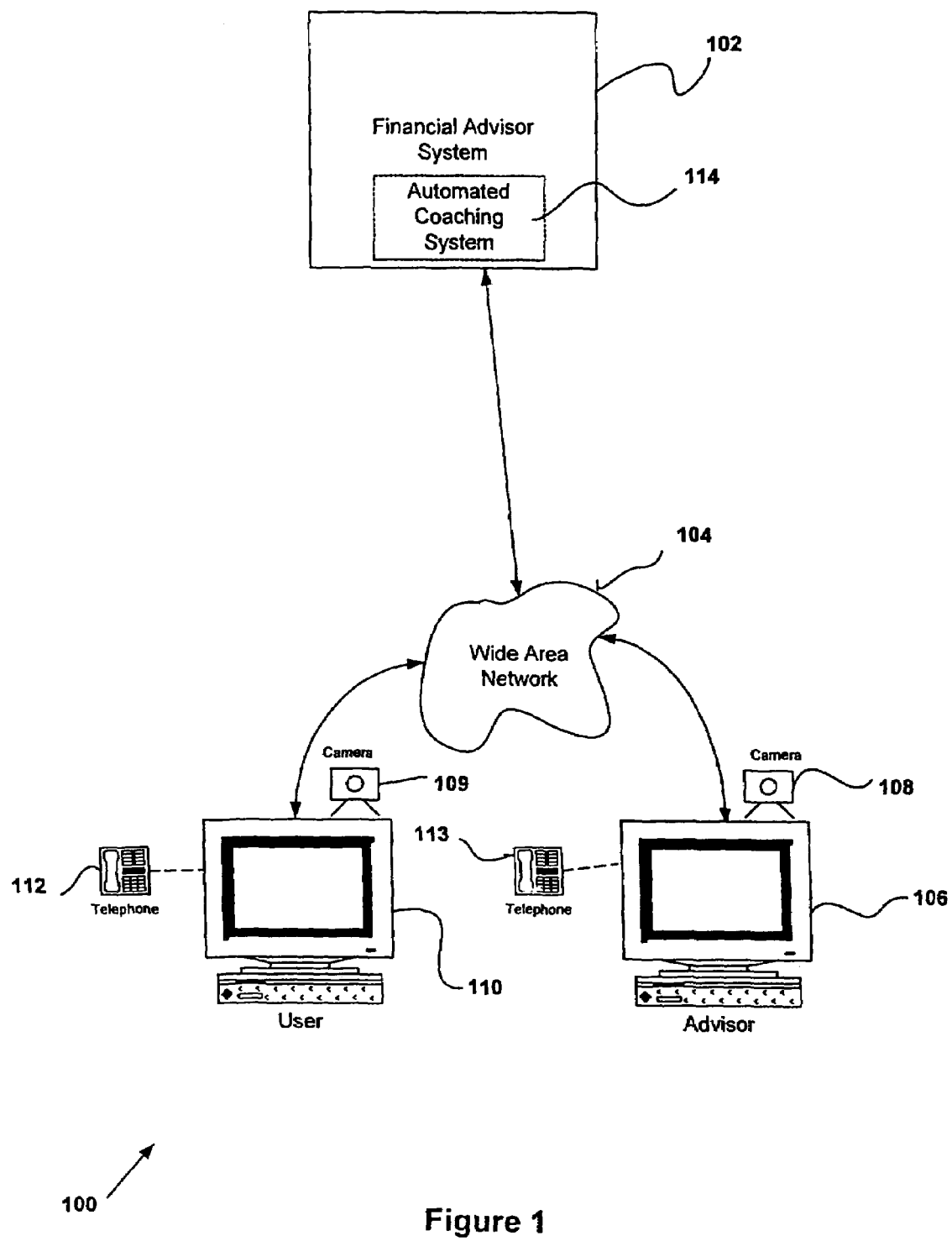
FIG. 1 illustrates a representative system architecture in accordance with a preferred embodiment.

FIG. 1 is an illustration of one embodiment of a financial management information system, in accordance with the present invention, for providing personalized financial advice in a collaborative computing environment. The term "coaching" in these patents is used to describe the limited analysis/feedback provided by automated rules-based coaching. In FIG. 1, financial management system 100 includes a financial coaching system 102 connected through the Internet 104 to a live advisor terminal 106 and a user terminal 110. The Internet is based on the TCP/IP communication protocol first developed by the Department Of Defense in the 1960s. The present invention may be implemented using any other protocols and many other networking system, including wireless networks, the Network File Service (NFS) protocol used by Sun Microsystems or a Novel network based on the UDP/IPX protocol.

Preferably, the financial coaching system 102 communicates with the user through any number of devices such as handheld wireless personal organizers, pagers, cellular telephones, land telephones and regular desktop computers. All of the above equipment can act as a user terminal 110. The financial coaching system 102 includes the automated coaching system 114 that dispenses natural language, textual coaching to the user at the user terminal 110

The user (e.g. individuals or company representative seeking financial advice) may access the system using a user terminal 110 (e.g. personal computer). A typical user computer terminal would be described in more detail in FIG. 3. The user computer is preferably equipped with software to receive live streaming video and/or still pictures over the Internet 104, from the advisor video camera 108. Preferably, the user terminal 110 is further equipped with a video camera 109 and software to transmit live streaming video and from the user, across the Internet 104 to the live advisor at the advisor terminal 106. Access to the live financial advisor 106 and all other services provided by the Financial management system is controlled and channeled through the Financial coaching system 102. The user can access the financial coaching system 102 through the Internet 104 or by telephone 112. A user telephone call is channeled through a call center discussed further subsequently in FIG. 4 to the Financial coaching System and to the live advisor 106.

The live advisor terminal 106 is preferably equipped with the video camera 108 for transmitting live streaming video. The live advisor 106 may further communicate with the user via a telephone 113.

Figure 2:
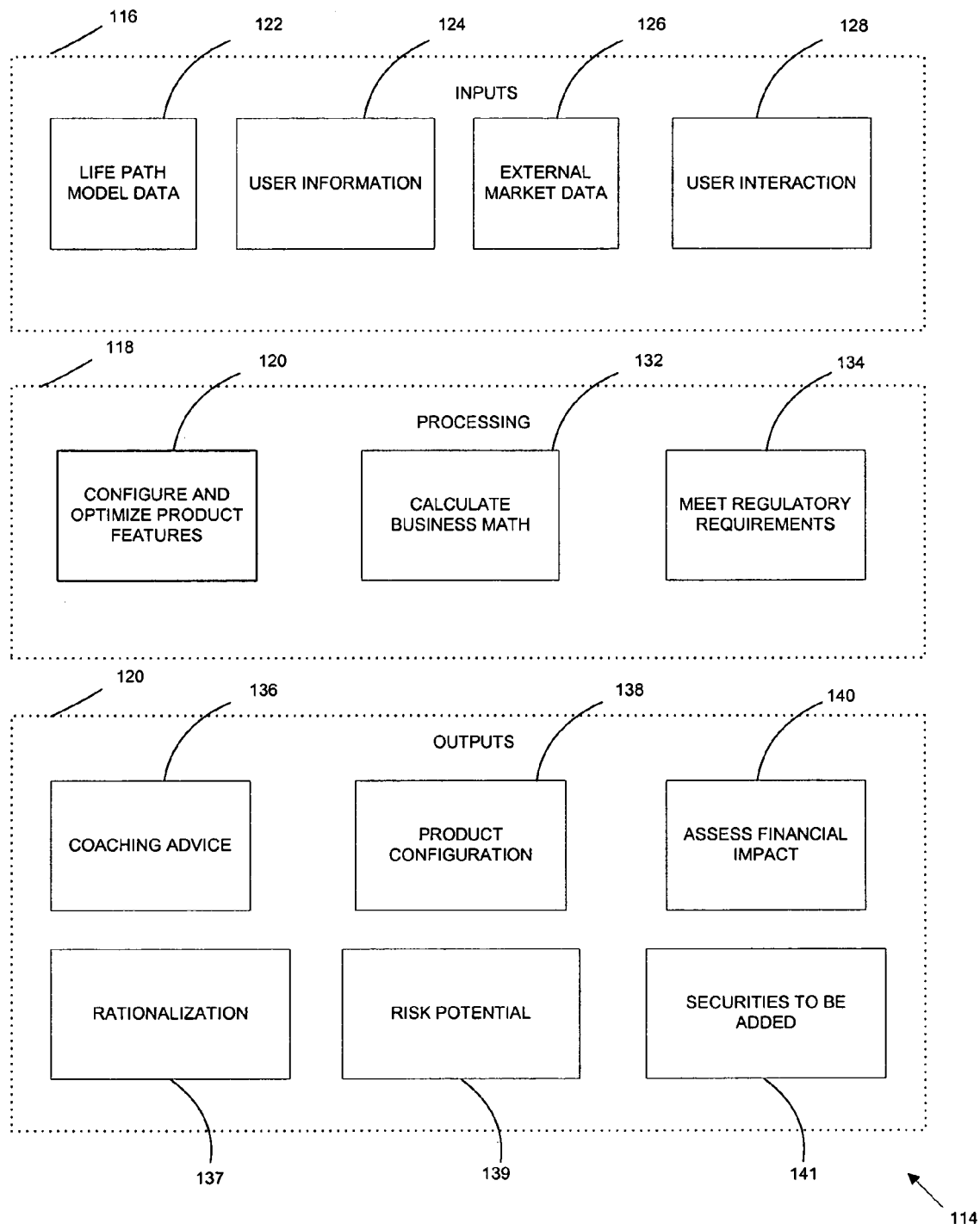
FIG. 2 is a block diagram of an automated coach of the present invention.

FIG. 2 is a detailed diagram showing the data and processes relating to the automated coach 114 of the present invention. Advice engine 114 includes an input section 116, a processing section 118 and an output section 120. Input section 116 includes the typical input information to be supplied to automated coach 114. In a preferred embodiment, input section 116 includes life path model data 122, user financial information 124, external market data 126, as well as user interaction data 266. Life path model data 122 can be, for example the output data from the LifePath model further described in a related application titled, A Financial Planning and Counseling System Projecting User Cash Flow with Ser. No 09/705,288, by the same inventors as the present application, and filed on the same day as the present application and herein incorporated by reference. The LifePath model aggregates the user life intentions into a cash flow model over a desired period of time. The user life intentions include revenue intentions and expense intentions. Once the aggregated model is formed possible period of cash shortage are highlighted and user is focused on possible solutions. The LifePath Model data 116 generated from the user interactions with the LifePath model is used as input to the coaching engine 114.

User financial information 124 includes static financial information provided by the user as well as dynamic financial information maintained by third-party financial institutions. This can include such information as the user's various accounts at other financial institutions, as well as inputs from other financial programs such as Quicken® or MS Money®. External market data 126 includes market data relating to the product choices available to the user. The financial institution offering the service may use the automated coaching engine 114 to offer to the user specific financial products pertinent to the user's situation. This information may include other institutions products and the coaching engine 114 may be used to obtain information from those outside sources. User interaction 128 includes information gathered based upon the user's interaction with the system. This may include a user profile used by a web server to customize a web page to the user's needs.

Processing section 118 illustrates the typical processing modules required for the coaching engine 114. In one embodiment of the present invention, coaching engine 114 configures and optimizes 130 the features of products available to the user. For example, a bridge loan product suggested to the user as a possible solution to a cash shortage problem, may be packaged as fixed rate loan or as a variable interest loan. Furthermore, different Annual Percentage Rates (APR) and different initial costs may be offered as alternatives for each loan product. The automated coaching 114 may be used to configure optimize the features of this product. Similarly, processing section 132 performs the calculations relating to the potential products available to the user in accordance with the input data summarized in input section 116. In the case of the previous example of the bridge financing, the automated coaching 114 may calculate the user's monthly payments. Furthermore, processing section 118 includes a regulatory requirements module 134 that provides the necessary processing to ensure that the advice generated by the coaching engine 114 complies with applicable government regulations. For example, a consumer loan may have different maximum interest rates in each state. The automated coaching 114 can check for these discrepancies.

Output section 120 includes the typical output elements from the advice engine 114. For example, the coaching engine 114 can provide coaching 136 which provides the user with reasoned financial advice and product recommendations. The coaching engine presents its analysis and advice in natural language in simple and easy to understand manner. Product configuration 138 provides the user with a product recommendation in addition to the specific product information tailored to the user's needs. Similarly, the output section 120 can assess the impact 140 to the user's financial health. Moreover, the output section 120 can output a rationalization of the proposed product configuration 137, an explanation of risk potential 139, and a suggestion of securities to be added 141, each of which is discussed in detail below.

Coaching is preferably done in a rules-based "if-then-else" structure which models a distinct domain of financial services. While many modelers produce numerical output, these coaches output syntactically and semantically correct natural language. Of course, other techniques are also suitable, as will be appreciated by those who are skilled in the art.

The distinction between coaching and advice is important. Advice recommends specific buy/sell activities. Coaching, on the other hand, alerts the customer to issues which need to be addressed, frames decisions which need to be made, signals customers when certain strategic conditions obtain. Of course, there is a gray area between advice and coaching but, in general, advice and coaching are considered to be distinct activities.

Figure 3:
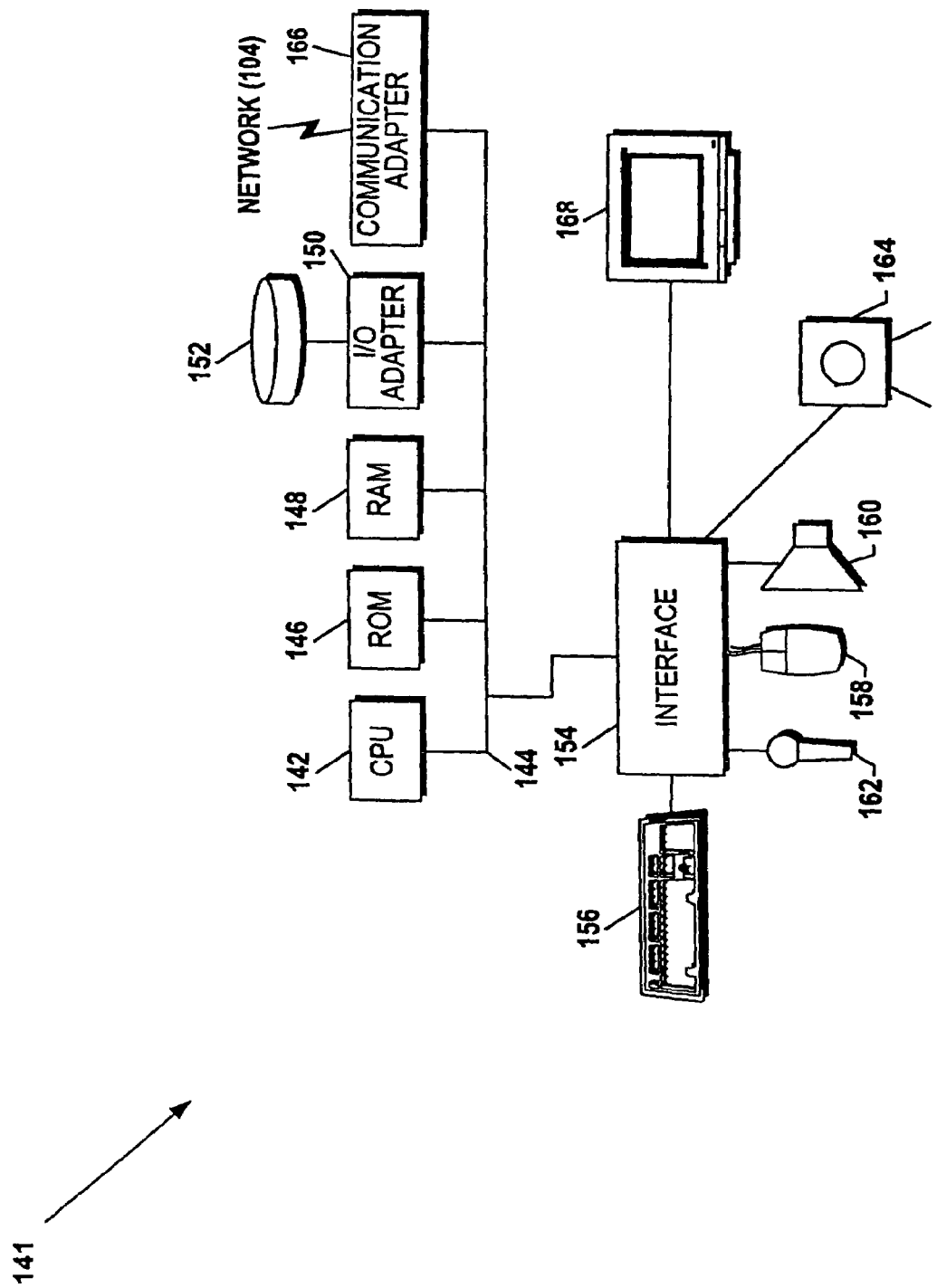
FIG. 3 is a block diagram of a representative hardware environment in accordance with a preferred embodiment.

FIG. 3 is a computer system architecture that can be used in implementing the present invention. This computer system architecture may be used to implement a user workstation, or any of the servers called for in FIG. 4. Alternatively, other computer system architectures are suitable as well. The present invention may be practiced on any of the personal computer platforms available in the market such as an IBM™ compatible personal computer, an Apple Macintosh™ computer or UNIX™ based workstation. The operating system environment necessary to practice the present invention can be based on Windows™, NT™, UNIX™, Apple Operating System™, Solaris™ or open source operating system software such as Linux™ and Apache™. Furthermore, the computer system can support a number of processes. As appreciated by one skilled in the art, the processes may be written in any of the available programming languages including object oriented programming languages such as Java™ or C++.

The computer system architecture 141 of FIG. 3 includes of a central processing unit 142, such as a microprocessor, a read only memory (ROM) 146, a random access memory (RAM) 148, an input and output adapter 150, a storage device 152, and interface 154 connecting a plurality of input and output device such as a keyboard 156, a mouse 158, a speaker 160, a microphone 162, a video camera 164, a display 168, and a system bus 144 interconnecting all the components together. The computer may also include such devices as a touch screen (not shown) connected to the bus 144 and communication adapter 166 such as a dial up modem, a Digital Subscriber Line (DSL) modem or a cable modem, for connecting the workstation to the Internet 104. The storage device 152 can be any number of devices including but not limited to hard disk drive, a floppy drive, CD-Rom, DVD, and a tape device, and removable magnetic storage devices such as a Jazz™ drive or ZIP™ drive. There are therefore a number of computer readable media encompassed by system 141, including but not limited to RAM 148, ROM 146, storage device 152, and storage accessible over the Internet 104.

Figure 4:
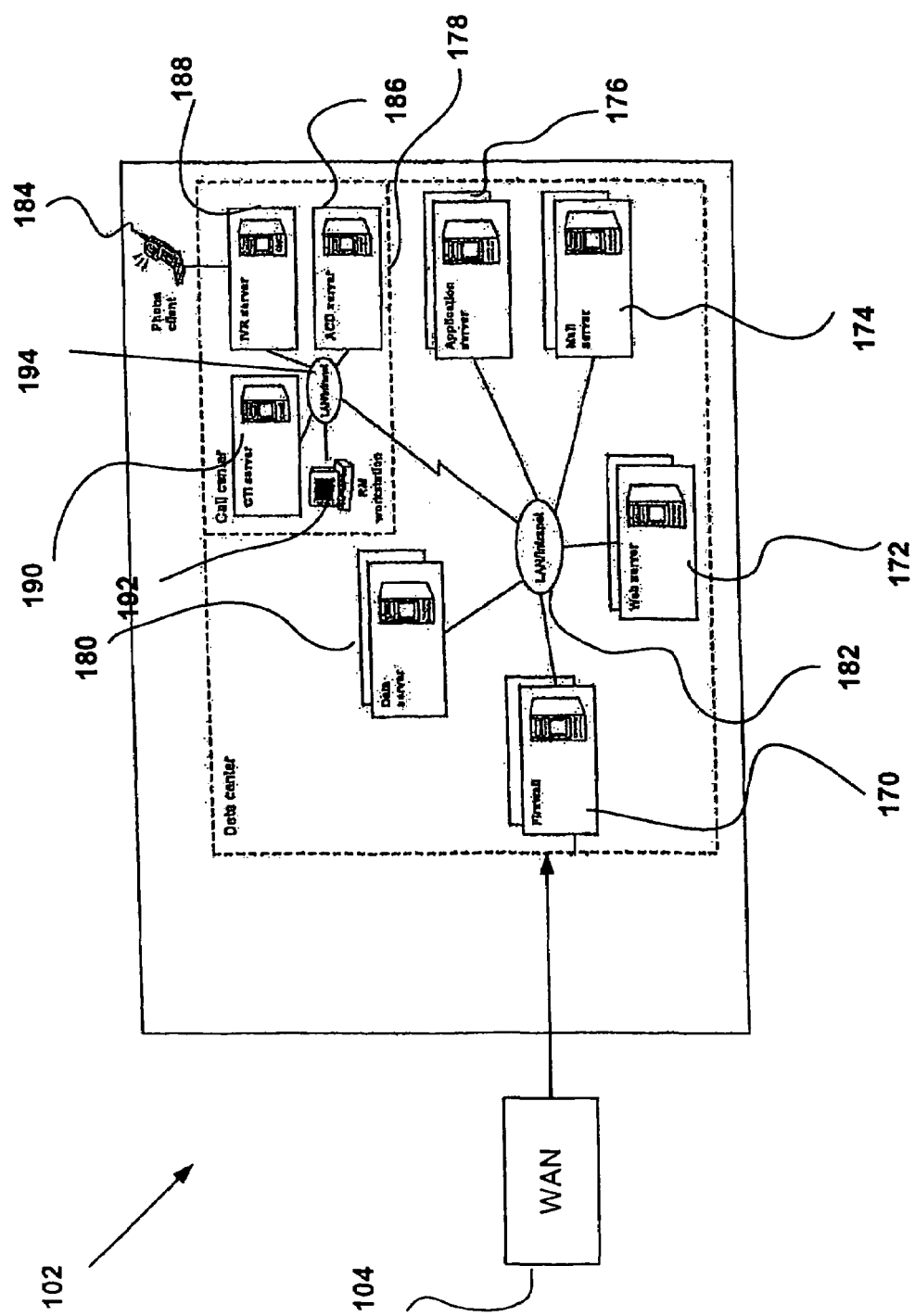
FIG. 4 is a block diagram of a financial management system of the present invention.

FIG. 4 is a block diagram of an implementation of the financial coaching system 102. The user may access the system through the Internet 104 and through a firewall server 170. A Web server 172 provides the user with a personalized website providing an interactive interface between the user, the financial coaching and financial management system 102. The financial coaching system 102 further includes of a mail server 174, an application server 176, a call center 178 and a data server 180, all connected to the local area network 182. The local area network (LAN) 182 may be any wide area intranet system or a global area network such as the Internet.

Security is important in any financial system. The firewall server 170 controls the access to the financial coaching system. The purpose of a firewall server is to prevent access to the system by unauthorized users and it would be appreciated by one skilled in the arts. Firewall servers are available through a variety of vendors and have become a standard feature of any secure system used as the primary defense against intruders and hackers.

The web server 172 provides a personalized interactive web page environment for the user to operate in once he accesses the system. The web page is acting as the web interface between the financial system Web pages are created using the Hyper Text Markup Language (HTML) and scripting languages such as Java Script™ or Pearl™ as well as Java™ applets. Creation of customized web page using any of the above programming languages is well within the scope of one skilled in the arts. The personalized web page provides an environment and an interface for the user to interact with the financial coaching system 102. As an example, in one embodiment of the present invention, by selecting an appropriate icon from the interactive personalized website, the user is able to learn, plan, decide, transact and monitor his financial model.

The mail server 174 handles electronic mail communication between the user and the financial coaching system 102. The Mail server 150 may operate using any standard protocol such as Simple Mail Transfer Protocol (SMTP) and it is implementation is within the scope of the knowledge of one skilled in the art.

The various modules of the financial advising system may reside on the application server 176. The modules may include the various coaching engines, the LifePath modeling and the portfolio modeling sub-systems. The applications may be implemented in many programming languages, including the object oriented programming languages such as C++ or Java™ and be based on any platform such as UNIX™, Apple OS™ or Windows™ and NT™. In one implementation of the present invention, all or some of the modeling tools as well as all or some of the automated coaching engines reside on the application server 176.

Alternatively, the user may also interact with financial coaching system 102 using a telephone 184. The user's call is channeled through the call center system 178. The call center 178 includes an Automatic Call Distributor (ACD) server 186, an Interactive Voice Response Server (IVR) 188, a Computer Telephony Integration (CTI) server 190 and a Relationship Manager (RM) workstation 192, all interconnected through the Local Area Network or intranet 194. The local area network 194 may also be used in interconnecting the various servers of call center. When the user calls into the financial advising system 102 using a remote telephone 184, the IVR sever 188 receives the user's telephone call. The IVR system greets callers, prompting them for identification, and providing some information automatically. The Automatic Call Distributor (ACD) server 186 distributes the call using the Internet Protocol (IP) over the network, to the appropriate live coach. The Computer Telephony integration server (CTI) 190 acts as the link between the live advisor's telephone call and the workstation based applications and allows them to automatically work together. As an example, when the IVR server 188 obtains some information about the calling user, this information is delivered to the live advisor's workstation 106, so the advisor does not have to request the same information again. Once the telephone call is properly routed to the live advisor, the user can user other means of communication such as electronic mail or White Board™ simultaneously while he is interacting with the live advisor.

The Data server 180 stores user input data and supplies the application Server 176. The data server 180 may physically reside on many servers and includes outside databases from which the financial advising system 102 can draw information such as actuarial data such as historical price data on securities from sources such as Reuters, user financial information such as banking and portfolio information in other financial institution, and market information such as the days closing numbers for various market indices as well as individual stock securities pricing information. Formatted in the Open File Exchange (OFX) format, now the accepted internet standard used by programs such as Quicken™ and MS Money™ the data server through the firewall can easily exchange information with the outside world and specifically the user. Furthermore, on the data server 180 may reside the coaching engine rules for various coaching engines 114 can reside data server 180.

It should be noted that various computing platforms could be used to access the financial management system of the present invention. For example, a networked personal computer environment, a client-server system, a mainframe terminal environment, WEB TV terminal environment, dumb terminal environments can be used to access the financial management system of present invention. Depending upon the user's needs, a client-server system may be the most preferable computing system for implementing the financial system of the present invention.

Furthermore, the representation of each server such as an application server or a data server is a logical representation. The actual physical systems may be distributed over many servers, or be included on a single machine.

Figure 5:
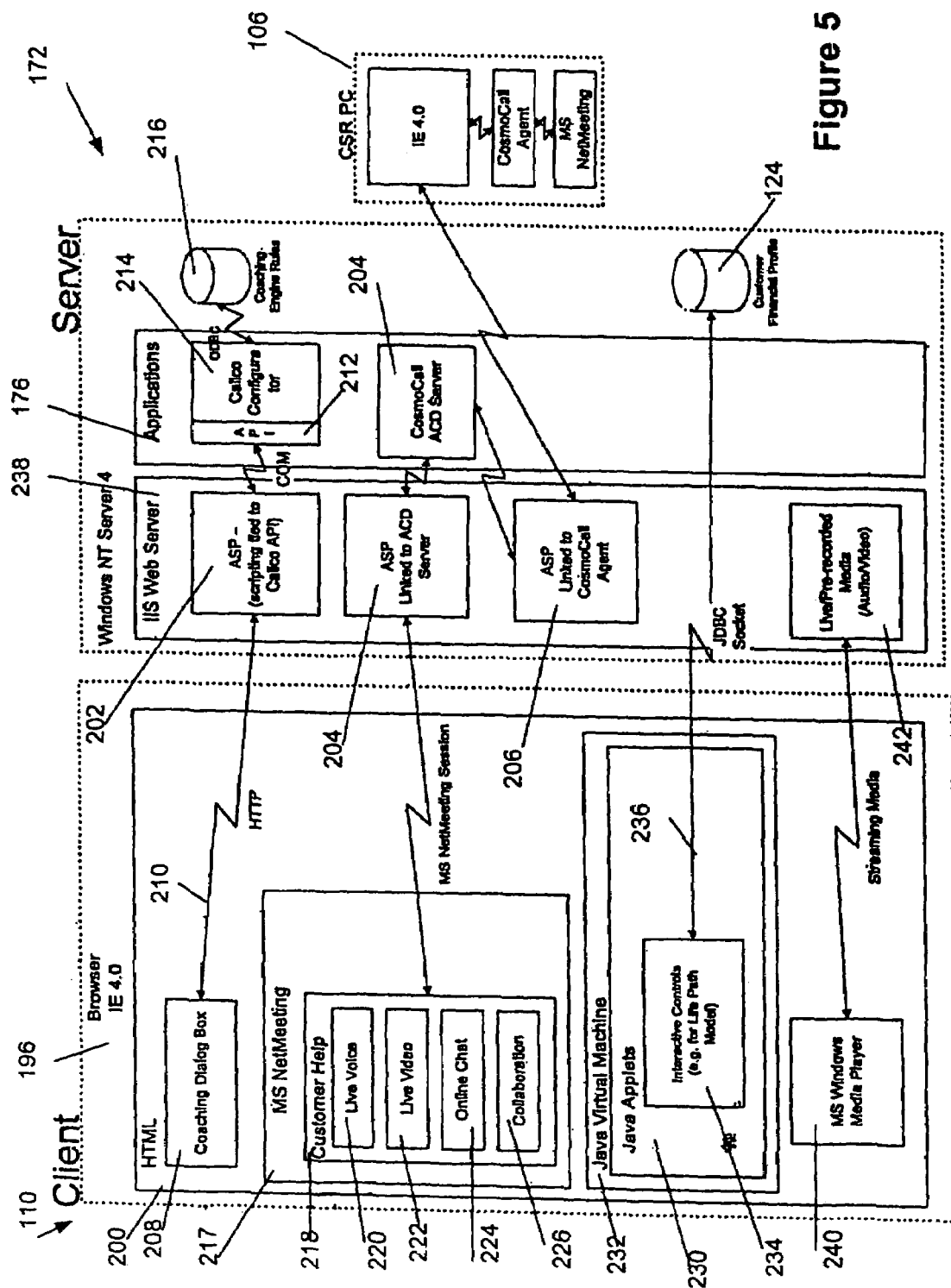
FIG. 5 represents an embodiment of the client side software implementation and the server side software implementation.

FIG. 5 illustrates embodiments of the client side software implementation and the server side software implementation. On the client side, the client browser 196 is running on the user terminal 110, and on the server side the server operating system software 198 may be running on any of the servers depicted in FIG. 4 such as the web server 172 or the application server 176. In other embodiments of the present invention both the web server and the application server may be residing on the same physical computer. In another implementation of the present invention, the two servers may be located on separate machines.

The client browser 198 opens and interprets a web page 200 written in for example, Hyper Text Markup Language (HTML). On the web page 200 various selections would allow the user to communicate with the web sever 172 and the application server 176 and allows the user to request information, or run applications. On the server's side, the user's request is received through Active Server Pages (ASP) 202, 204, 206. Each user request may triggers a server-side script that would launch an application.

In one embodiment of the present invention, when the user selects automated coaching in the automated coaching dialogue box 208, a request is sent through the Internet using HTTP protocol 210 and launches the script for the ASP 202 tied to an Application Programmer's Interface 212. The Application Program Interface (API) 212 processes the script and launches a Configurator 214. The coaching engine rules database 216 provides the coaching engine rules to a Configurator 214.

The Configurator 214 is a scalable configuration and recommendation system made by Calico Commerce Inc. of San Jose, Calif. The coaching engine dispenses context sensitive coaching to the user regarding his financial situation. The Calico Configurator 214 is a generic engine capable of being configured and customized to suit specific uses. The coaching engine rules 216 allow customization to implement aspects of the present invention.

In another embodiment of the present invention, the user may elect to complement the automated coaching with advice from a human advisor. The availability of such services may be based on user negotiated service level agreement. The user contacts a live advisor by selecting from one of the many communication options available to him such as live voice 220, live video 222, online chat 224 or collaboration 226 to communicate with a live advisor 106. The communication is preferably established through the ASP 204 linked to the ACD server 186 and which in turn launches the ASP 206 linked to a live advisor terminal 106. The communication session may be managed by MS NetMeeting™ 228, a software available from Microsoft® corporation.

Preferred implementations of the automated coaching dialog 208 and the live coaching communication manager 217 are further described in the related U.S. applications titled A Financial Planning and Counseling System Projecting User Cash Flow with application Ser. No. 09/705,288, Financial Modeling and Counseling System, application Ser. No. 09/705,154, Communication Interface For A Financial Modeling and Counseling System, application Ser. No. 09/705, 290, and A User Interface For A Financial Modeling System, application Ser. No. 09/704,838, and Financial Portfolio Risk Management, application Ser. No. 09/705,287, all by the same inventors as the present application, and all filed on the same day as the present application and all herein incorporated by reference.

In another embodiment of the present invention, the user may select a function icon such as an interactive control of a model such as the LifePath model. The user's request is coded in a Java applet 230 which runs on a Java Virtual Machine 232. The selection launches a connection through the network to the database 124 holding user financial information and profile. The user can then manipulate this information while connected to the database 124.

In yet another embodiment of the present invention, the user can receiving live streaming audio or live streaming video 242 through the network residing on the IIS server's 238. On the user side an application such as MS Windows™ Media Player™ 240 would interprets and allows the user to see or hear the data.

Figure 6:
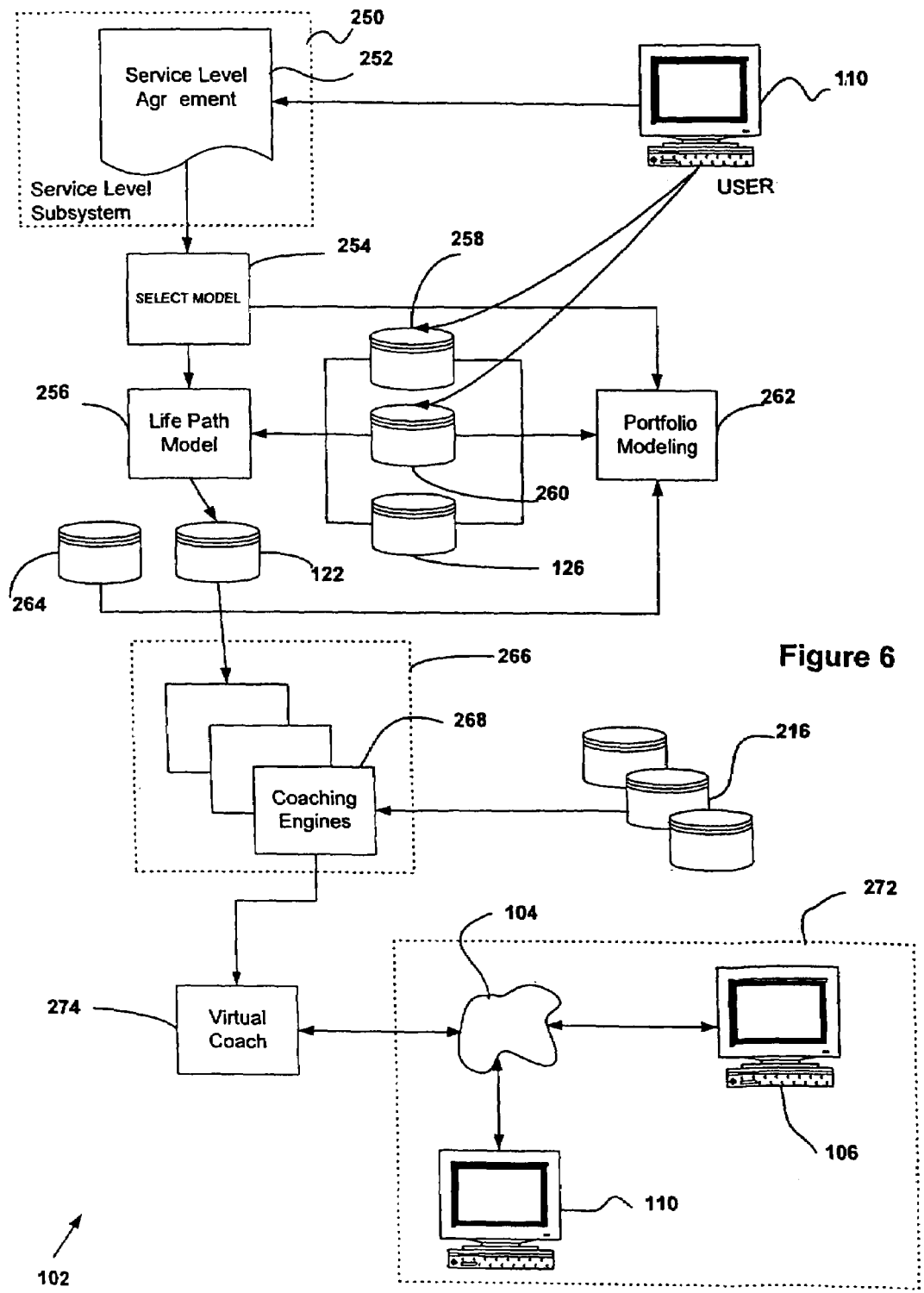
FIG. 6 is a block diagram of an exemplary data flow within the financial management system.

FIG. 6 is an illustration of the data flow within the financial management system 102. A user using financial computer 110 preferably connects to the Financial coaching system 102 using the Internet 104. The user at a user terminal 110 enters the Financial coaching system 102 at the service level subsystem 250. The service level agreement provides the level of services to which the user is entitled. Once the user has negotiated a service level agreement 252, he is prompted to select the model to be used in operation 254. In an embodiment of the present invention, the level of service and support selected in the service level agreement 250 controls the user's access to different modeling tools.

In a preferred embodiment of the present invention the LifePath model 256 may be the hub of the financial institution's relationship. The LifePath model 256 provides data to all coaching engine 114 allowing customized coaching output to be dispensed to the user based on his unique financial situation. The LifePath model 256 combines all the pertinent financial information about a user in one coherent and comprehensive picture and models the user's life intentions into an aggregated cash flow system over a user selected period of time. Using the terminal 110 the user inputs his life intentions in terms of projected income and expenses. The LifePath model 256 maintains an interactive dialog between the user and financial management system 100. The LifePath model 256 integrates the financial information available about the user in accordance with the user's service level agreement 252 to create an aggregate forecast of cash flow over the user's lifetime. The financial information available about the user includes the user's life intentions data 258 and the user's external financial data 260. In a preferred embodiment of the present invention, the user's external financial data can include current checking account information from the user's bank or data related the user's 401K plan. By incorporating external data 260 into the LifePath model 256, the system is capable of dynamically analyzing the financial needs of the user and providing the user with an understanding of their financial health at any point with minimal input form the user. As discussed above, personalized service level agreement 250 can optionally allow the user to limit the system's and/or advisor's access to the user's external financial data 260. The external data 260 and the user's life intentions data combine to form the user information 124 used by the coaching engines 114.

Additionally, life path model 256 also integrates external market data 126 into the aggregated forecast of the user's cash flow. In one embodiment of the present invention, external market data 126 includes information such as current mortgage interest rates or market inflation rates. Access to both internal and external databases is controlled by the user's service level agreement.

Alternatively, the user may by pass the LifePath model 256 and start with the portfolio modeling tool 262. The service level agreement determines the level of service to which a user has agreed. The user would supply his financial portfolio information to the financial advising system 102, either directly using the user terminal 110 or indirectly through the Internet 104, by accessing a multiplicity of databases 258, 260 and 126 and accessing information such as his securities portfolio at a particular brokerage firm.

The financial portfolio modeling tool 262, is an interactive tool that has access to the all the information available to the LifePath model 256, such as the user's life intentions data 258, the user's external financial data 260, as well as external market data 126. User insight data 264 and aggregated data from the LifePath model 122 is also available to the portfolio modeling tool. As a result the user has little to input and may start using the portfolio model 262 very quickly without the need to do a lot of tedious data input. The financial portfolio modeling also allows the user to access a computer coach and/or a live advisor based in part on the service level agreement. An alternative embodiment allows the user to use the LifePath model 256 and set his long term financial goals and then use the portfolio modeling tool 262 to adjust his investment portfolio to better achieve his long term financial goals.

Coaching generating subsystem 266 includes one or more coaching engines 268. Coaching engines 268 dynamically analyze the financial needs of the user in accordance with the user's service level agreement. Furthermore, the coaching engines 268 are configured to operate with coaching engine rules repository 216. Coaching engine rules repository 216 is a collection of rules-based business logic that produces clear automated advice.

In an embodiment of the present invention a compound growth factor is calculated for the user's portfolio, by logarithmically averaging the portfolio's growth over the selected period of time as shown by the risk/reward map. The user is given an estimate as to the chances of achieving a user inputted target value and natural language coaching analysis compares the user's portfolio to the various market benchmarks, by comparing the and suggest possible ways of reducing risk and increasing return on the investment. In another embodiment of the present invention, the market comparison is done by calculating a Value At Risk (VAR) and a Beta value for the portfolio and compare these figures to that of the market. The analysis is based on business logic rules and industry accepted statistical and numerical analysis. However, calculated statistical parameters presented numerically without context will be meaningless to the average investor. So statistics will be interpreted by rule based coaching algorithms, which states the results in non-technical natural language. Table 1 shows a sample of some interpretive coaching in response to user questions.

TABLE 1

| Investor question | Logical test or calculation | Sample coaching |
| --- | --- | --- |
| "How can I tell how well my portfolio is doing amidst all the daily ups and downs?" | Logarithmic curve fit to historical portfolio time series data | "On average, your portfolio was worth an estimated $180,000 one year ago, and about $200,000 today. It has grown at the rate of 11%. Average annual growth over 5 years is 9%. This includes brokerage costs and the amounts of money you invested or cashed out. |
| "How much of my portfolio growth has been due to market changes and how much to new capital investment and withdrawals?" | Logarithmic curve fit to historical data, adjusted for capital inflows, outflows and commissions, etc. | "When the effects of capital inflows, outflows and brokerage expenses are removed, your net growth has been an estimated 9% over the past year. Estimated average Return On Investment is 7% over the last 5 years." |
| "How good is this growth compared to the market?" | Comparison of net average growth to user-selected benchmarks | "Your 7% annual estimated net growth has significantly under-performed 15% in the NASDAQ, 11% in the DOW and 13% in the S&P 500." |
| "What have been my upside opportunities and downside risks?" | Calculation of 95% confidence intervals around unadjusted historical growth curve | "In a typical trading month, your portfolio will reach a peak of 10% growth on one high-performing day. On the other hand, it will typically suffer a one-day, 10% loss." |
| "How do these risks and opportunities compare to the market?" | Calculation of 95% confidence intervals around user-selected market benchmark(s) | "Compared to an estimated average one day a month upside/downside of 2% in the NASDAQ you have assumed 5 times as much risk." |
| "How much of the growth in my portfolio can be attributed to the general market?" | Calculation of correlation coefficient and beta to chosen | "About 90% of the fluctuations in your portfolio correspond to fluctuations in the |

TABLE 1-continued

| Investor question | Logical test or calculation | Sample coaching |
|---|---|---|
| | benchmark(s) | NASDAQ. Typically, your monthly highs and lows overshoot the NASDAQ by 8%." |
| "What is the bottom-line analysis of my portfolio's historical performance?" | Summary of previously referenced statistics | "The 1 in 20 odds you have of losing up to 10% of your portfolio are very high compared to only 2% in your chosen benchmark, the NASDAQ. Your net compound annualized return is only 7%, compared to 15% in the NASDAQ. This return is only 5% higher than you could achieve with a risk-free portfolio of US Treasury notes." |

Coaching engine rules repository 216 generates its advice using LifePath data 122 and user insight data 264. Alternatively the investment portfolio data from the portfolio modeling tool 262 triggers the coaching engines advise. In one embodiment of the invention, user insight data 264 includes transaction history, product or purchase history, as well as demographic information about the user.

In addition to providing coaching to the user, coaching generating subsystem 266 also recommends product solutions to the user. As an example, in one embodiment of the present invention, the advice engines 268 can recommend that the user include deposit products and loan products in their financial plan. For example, the coaching engine 268 can recommend that the user acquire a certain mortgage or bridge financing. Similarly, the coaching engine 268 can also direct the user to the need for financial products such as, home improvement, line of credit, or credit card products. Coaching engine 268 can also have access to product information from various financial institutions (not shown). Accordingly, the user can request additional information about the various products recommended by the system.

The user can access their financial plan or life path model using user terminal 110. User terminal 110 is part of collaborative computing environment 272 and is in data communication with virtual coach 274 and the advisor terminal 106 through the Internet 104.

The advice and product solutions generated by the advice generating subsystem 266 are presented to the user through virtual coach 274. Virtual coach 274 presents the product recommendation with accompanying rationale. The user can test different scenarios by altering the data captured by life path model 256. Each scenario can then be analyzed by coaching engine 268. The automated coaching system 114 may include all or some the advice engines 268, the rule repository 270 and the virtual coaching 274.

In cases where the user may still feel the need to contact a human advisor, the automated coaching system 114 has already framed the problem for the user and the live advisor. Thus, both can immediately focus on the alternative solutions to the user's issues in a more cost efficient fashion.

Depending on the level of service the user has negotiated with the service level agreement 252, he may have a multiplicity of modeling tools available in the financial management system. In alternative embodiments of the present invention, modeling tools for analyzing various financial instruments such as bonds, reverse mortgages, option contracts and a like may be available to the user. In another embodiments of the present invention the user's investment portfolio is modeled by the modeling tool.

Figure 7:
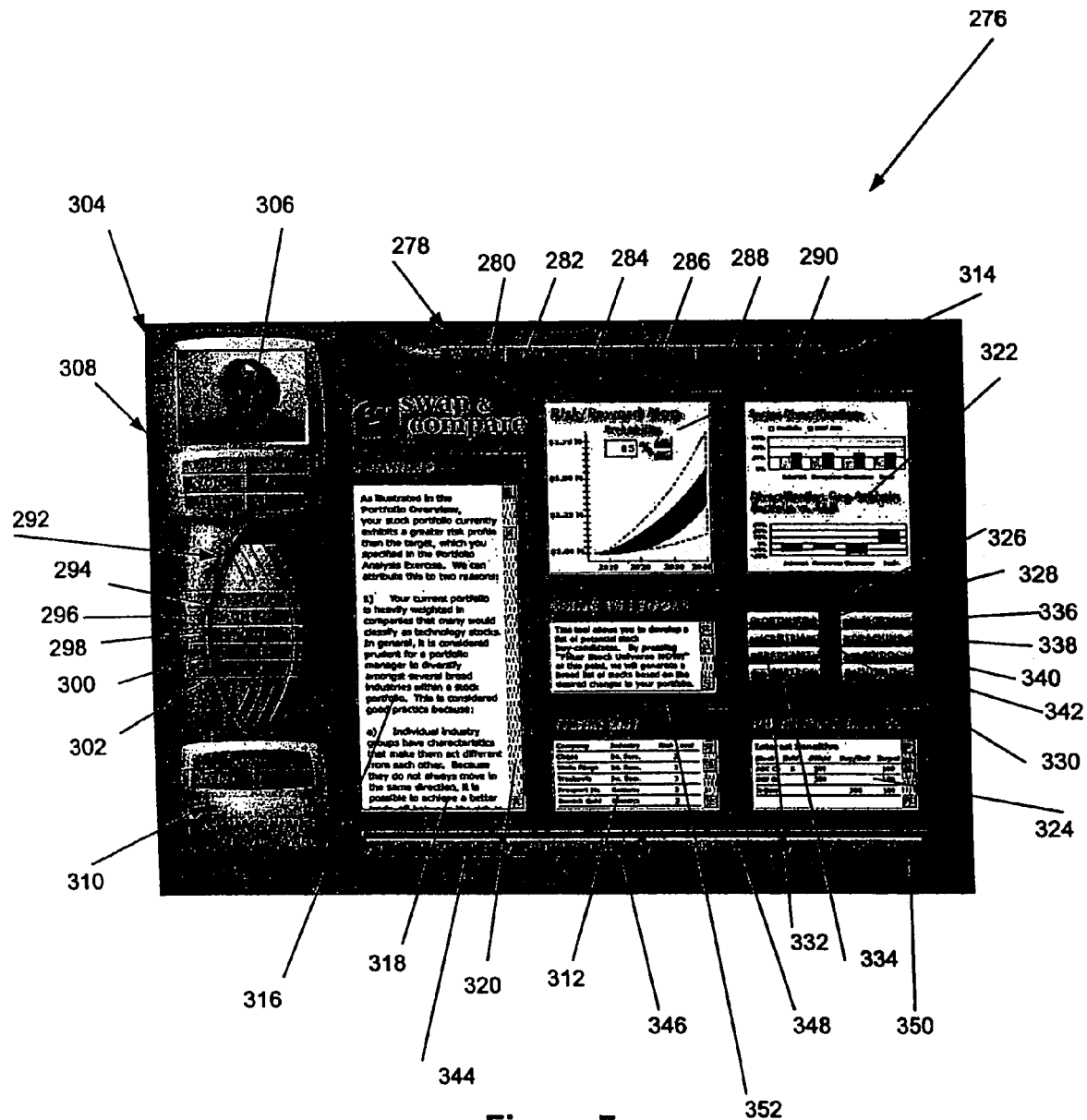
FIG. 7 is an illustration of an investment portfolio generator web page interface.

FIG. 7 is an exemplary graphical user interface 276 that embodies the various concepts and methods set forth for financial portfolio modeling. As shown, the graphical user interface 276 includes a plurality of selection icons 278 including a my page icon 280 for displaying a graphical user interface specifically tailored for a particular user, a save icon 282 for saving any changes made to the graphical user interface 276, an export icon 284 for exporting data displayed by the graphical user interface 276, a print icon 286 for printing various fields of the graphical user interface 276, a help icon 288 for obtaining help information, and an exit icon 290 for exiting the graphical user interface 276.

My page icon 280 displays a web page that can be customized to each user's need, simplifying the use of the portfolio model 262. In one embodiment of the present invention, the portfolio modeling system uses the Open File Exchange (OFX) protocol which has become the standard protocol for the exchange of financial information over a wide area network, and particularly the Internet. Thus exported data from the portfolio modeling system into other financial programs is formatted to be easily usable by these programs.

Further displayed on the graphical user interface 276 is a plurality of mode icons 292 for initiating various modes of operation. The mode icons 292 include a transact icon 294 for initiating transactions involving the purchasing and selling of investments utilizing a network, a monitor icon 296 for monitoring the performance of the investments, a model icon 298 for generating an investment model based on criteria entered by the user, an explore icon 300 for retrieving information on the investments, and a track icon 302 for tracking the investments utilizing the network. In the preferred embodiment of the present invention, the Internet 104 has access to outside databases such as Reuters and Bloomberg for historical and current securities pricing or market indexes.

With continuing reference to FIG. 7, a communication medium 304 may be employed to converse with other users, namely financial advisers, etc. Such communication medium 304 includes a window 306, and a plurality of communications icons 308 that enable various types of communication between the user and the live coach or advisor. Access to a live advisor is an optional feature the user negotiates in his service level agreement. However, automated coaching allows guides the user in most of his decision making and helps him be independent of the need to use a live advisor.

Using the graphical user interface 276, a user profile may be viewed and adjusted using a plurality of profile icons 310. A filtering field 312 is also shown in FIG. 7. Such filtering field 312 includes a plurality of companies and associated risk levels and industries which are displayed in accordance with the user's appropriate tolerance to risk and investment style. A risk/reward map 314 is also shown displaying the probability of the user reaching its financial goals. Also shown is a coaching window 316 for displaying coaching strings 318 based on a rule-based automated coaching engine. Such window 316 may include a field adjustment bar 320 in order to facilitate viewing of the coaching strings 318.

The coaching appearing in the coaching window 316 is dynamically related and customized to the user's portfolio characteristics. In an embodiment of the present invention a compound growth factor is calculated for the user's portfolio, by logarithmically averaging the portfolio's growth over the selected period of time as shown by the risk/reward map in the window 314. The risk/reward map 314 is interpreted by the coaching engine and displayed in natural language coaching strings in the coaching window 316 and suggest possible ways of reducing risk and increasing return on the investment.

Further features associated with the graphical user interface for the portfolio modeling include an information window 322 which illustrates various charts pertaining to sector diversification and other investment parameters. In one embodiment of the present invention, the sector diversification information is explained using the automated coaching 114. A portfolio model window 324 may also be displayed for portfolio modeling purposes. For example, interest sensitive stocks conforming to the user's investment parameters are suggested by the automated coaching 114 to counter-balance stocks with the opposite Beta value or less sensitive to interest rate fluctuations.

The service icons 326 are selected by the user when he needs various operations to be performed on his portfolio. The optimize icon 328 optimizes a securities list based on the newly specified criteria. The criteria icon 330 enables the user to introduce additional criteria for selecting a particular security. The trade list 332 displays the system recommended securities that should be sold based on the user criteria and his personal financial parameters. The filter icon 334 generates a filtered list of securities displayed in the filtered list window 312. Sort icon 336 sorts the list of securities based on a user selected criteria such as alphabetical order. The coaching icon 338 generates context sensitive automated coaching 114 related to the user's financial portfolio. The undo icon 340 undoes a specific swap of securities. The submit icon 342 submits and the user changes to his portfolio during the current session.

The user can set a target goal for his investment portfolio as well as his preferences by selecting the target and preference icon 344. He may do an analysis on his past or present portfolio by selecting the portfolio analysis icon 346. He may trigger specific coaching on specific a security or group of securities or even on whole industry sectors, as well as request more detail information by selecting the stock analyst icon 348. He may further model and analyze the effect of inclusion or exclusion of particular securities on his portfolio by swapping stocks in and out of the portfolio 350. When selecting a particular icon corresponding to the various tools, a corresponding help text string appears in the help screen 376, directing the user on how to use the particular tool.

Figure 8:
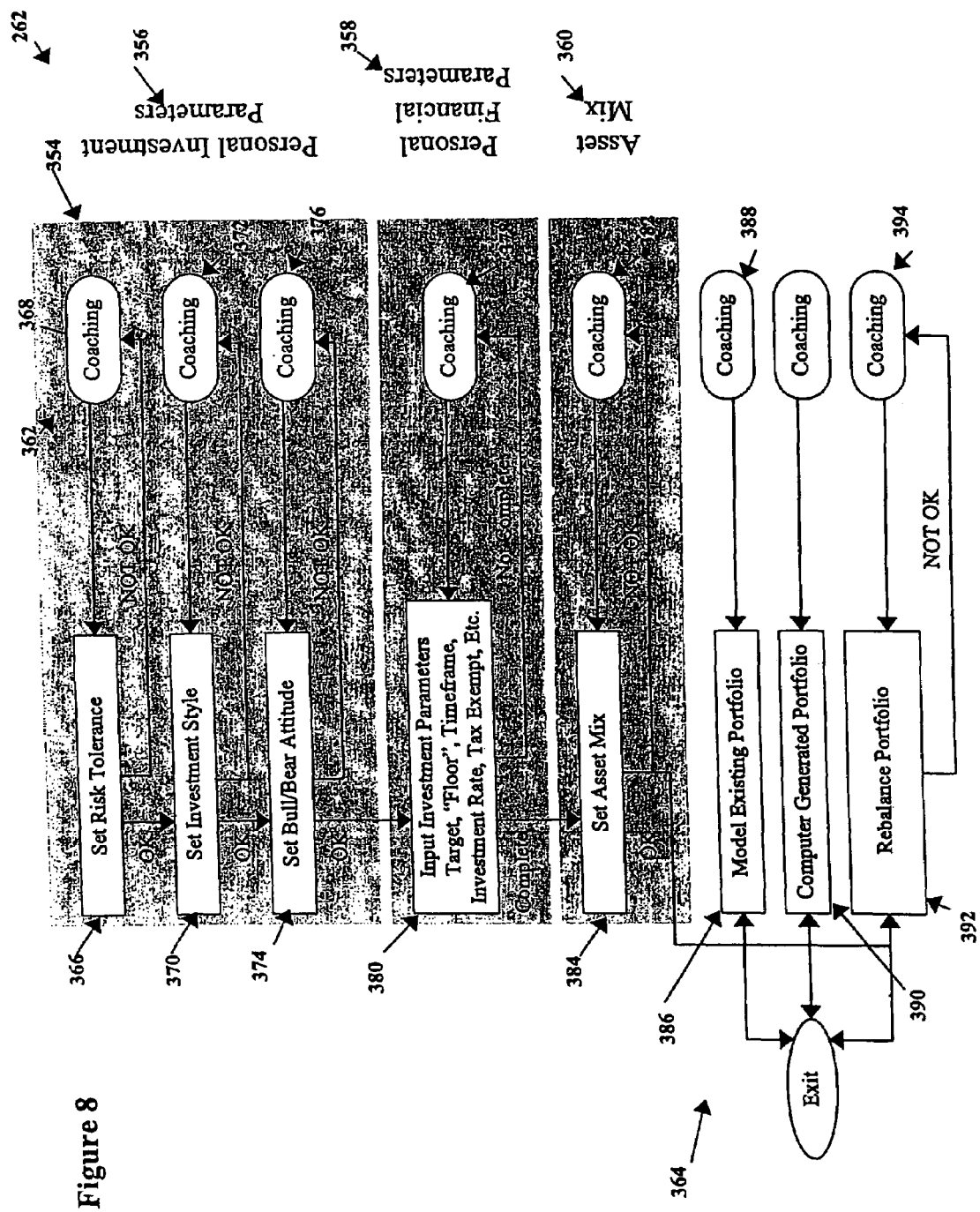
FIG. 8 is a flow diagram of an operation of the Investment Portfolio generator in accordance with a preferred embodiment.

FIG. 8 illustrates an investment portfolio management method utilizing an automated coach in a network based financial framework. First, in operation 354, a plurality of parameters is set for a subject utilizing a network. The parameters include personal investment parameters 356, personal financial parameters 358, and/or asset mix parameters 360. Such parameters may include a minimum retirement, target floor, investment rate, tax implications, etc. In operation, the parameters may be selected manually by the subject using a desired graphic user interface, or by a third party.

Next, the network is utilized to provide the subject coaching from an investment coaching engine in operations 362, where such coaching relates to the setting of the parameters. The coaching may be provided by utilizing a look-up table which is capable of generating various combinations of advice based on the settings. In the alternative, the advice may be generated using any other type of artificial intelligence system.

At least one financial model for a portfolio of the subject is subsequently generated in operation 364 based on the setting of the parameters. This may be generated using a system similar to that which generates the coaching, or any other desired means. The network is again used to provide coaching from the investment coach engine to the subject with the coaching relating to the generated financial model.

As shown in FIG. 8, the personal investment parameters include a risk tolerance parameter 366. Further, the coaching by the coaching engine 368 may provide a textual risk tolerance profile for the subject based upon an interpretation of current risk tolerance parameters of the subject as textual analysis.

Further, the personal investment parameters may include an investment style parameter 370. In such embodiment, the coaching by the coaching engine 372 provides a textual investment style profile for the subject based upon an interpretation of current investing style parameters of the subject as textual analysis.

In yet another embodiment of the present invention, the personal investment parameters include a bull/bear attitude parameter 374. A bull attitude is one of optimism that the stock market will go up, while a bear attitude is where the user believes the stock market would go down. In the present embodiment, coaching by the related coaching engine 376 provides a textual description of an implied future of financial markets and graphs showing forecast curves of financial markets based upon the building of financial market forecasts which are, in turn, based upon evaluations from financial experts.

In one embodiment, the coaching by the coaching engine 378 relating to the setting of the personal financial parameters in operation 380 provides an alert if the investment parameters of the subject conflict with LifePath cash flows or personal parameters based on a consistency check of the investment parameters with data obtained from a LifePath model 256 and personal investment parameters.

With continuing reference to FIG. 8, the coaching by the coaching engine 382 relating to the setting of the asset mix parameters in operation 384 provides a rationalization of the asset mix based on personal and financial parameters of the subject and at least one computer generated asset mix. No penny stocks would be included if the subject is conservative, only treasury bills. A pie chart may also be included that represents a portfolio showing the subject's assets.

In still another embodiment, the financial model comprises a model of an existing investment portfolio of the subject. Note operation 386. The coaching by the coaching engine 388 provides an analysis of market-related growth by security and sector, trend analysis, fee and service analysis, and/or dividend and interest impact based upon transaction history and current market values of the existing investment portfolio. The coaching by the coaching engine 388 may also provide an analysis of growth, risk and value of the existing investment portfolio based on market data and expert analyst opinion.

Still yet, the coaching by the coaching engine 388 may provide an evaluation of the existing investment portfolio relative to the personal and financial parameters of the subject based on a comparison of growth and volatility projected forecasts to the personal and financial parameters of the subject. It should be noted that similar capabilities may be provided using a model based on a computer generated portfolio in operation 390.

In operation 392, the financial model may include a model of an investment portfolio of the subject generated by the subject with the input of a private banker. Coaching by the coaching engine 394 provides an analysis of growth, risk and value of each security in the investment portfolio based on a concatenated, user-friendly English format of market data and expert analyst opinion obtained utilizing the Internet 104.

Further, the coaching by the coaching engine 394 may provide an evaluation of the contributions of securities in the investment portfolio relative to the personal and financial parameters of the subject based on a comparison of the personal and financial parameters of the subject to an analysis of risk compliance, growth, and volatility.

The LifePath and investment portfolio modeling systems mentioned herein is further described in the related U.S. applications titled Financial Portfolio Risk Management, Ser. No 09/705,287, A Financial Planning and Counseling System Projecting User Cash Flow with Ser. No 09/705,288, Financial Modeling and Counseling System, Ser. No. 09/705,154, Communication Interface For A Financial Modeling and Counseling System, Ser. No. 09/705,290, and A User Interface For A Financial Modeling System, Ser. No. 09/704,838, all by the same inventors as the present application, and all filed on the same day as the present application and herein incorporated by reference.

Currently, risk management is a vague area which advisors and clients typically address using judgment and intuition. Advisors and brokerage firms need to quantify risk to mitigate legal liability. In addition, investors want to quantify the impact of individual picks on their portfolio risk/reward. Further, regulators will be supportive of processes that help investors to become more knowledgeable about risk and avoid unaffordable losses. Finally, the brokerage industry needs to outsource risk management services to avoid any additional technology problems and to ensure third party objectivity.

Many investors build their own spreadsheets to understand their portfolio performance. The present invention provides automated coaching and new tools to benchmark portfolio performance, and by providing analysis the user is helped in improving his portfolio performance and reduce his risk exposure. The present invention accomplishes this by coaching the user in setting up a user profile based on the user's personal investment parameters 356.

Figure 9:
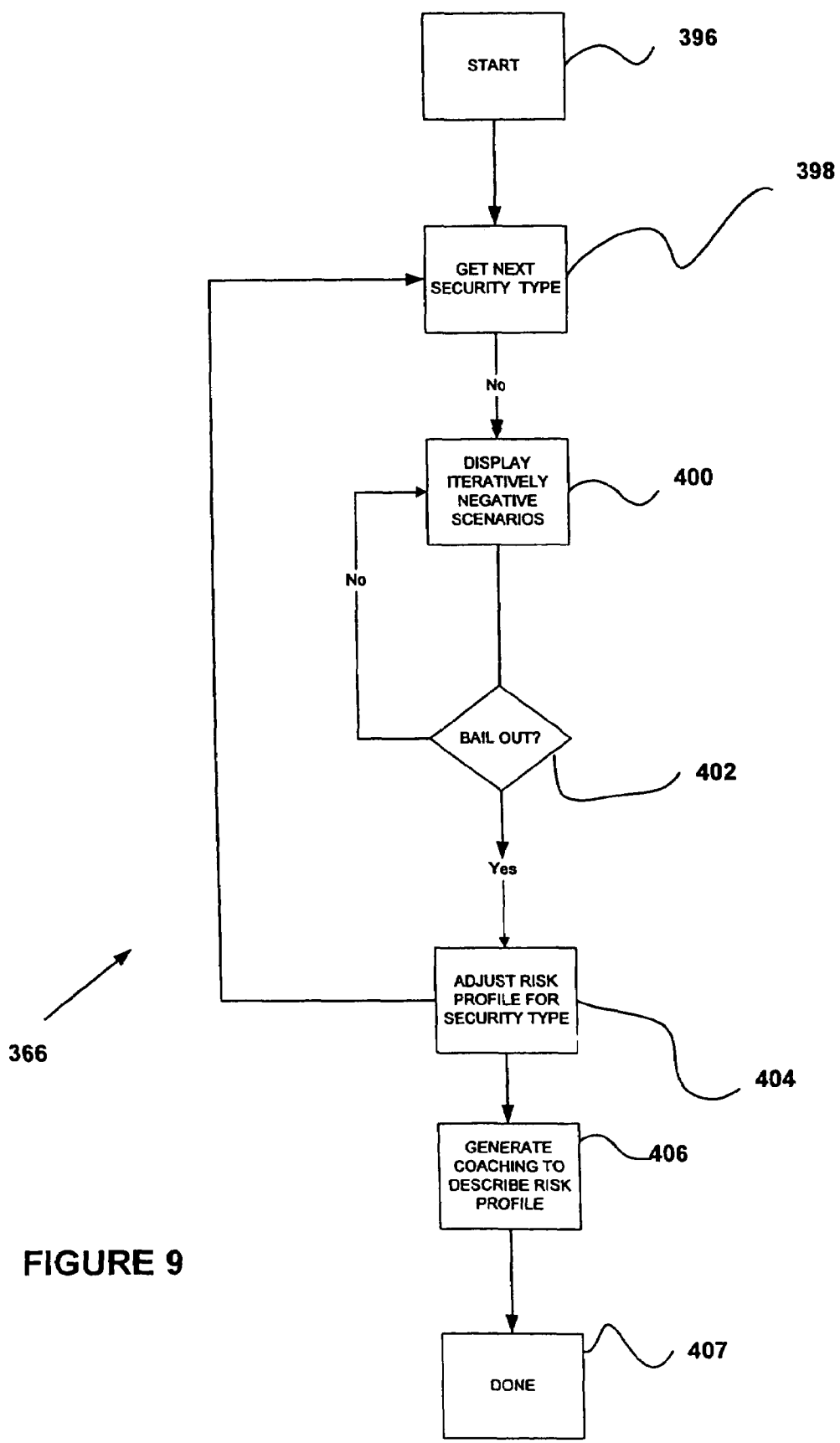
FIG. 9 is a flow diagram of how to set risk tolerance.

FIG. 9 is a flow diagram illustrating the set risk tolerance operation 366 in greater detail. Once the user starts at 396, he is prompted for the security type to be used for risk profiling 398. Next, an iteratively negative financial scenario is presented to the user and he is asked if he wants to bail out once confronted with this scenario 400.

The negative scenarios presented to the user are generated by the automated coaching 114 and may include scenarios such as negative news related to a particular security and the company's future growth or performance and profitability. Faced with this situation, the user may decide to hold on to the particular security or sell and bail out. In one embodiment of the present invention the representations may include both textual and graphical representation, and may further include headline news indirectly related to the particular company. Alternatively, the scenario generated may encompass as whole sector or industry such as the interest sensitive construction industry. Both indirect economic news such as a forecast of future interest rate and direct economic news such as declining housing starts or sales of new homes are presented to the user and his reaction to the negative news is indicative of his personal risk tolerance. If the user selects to bail out 402 based on the negative financial scenario, his risk tolerance profile is adjusted accordingly 404. If the user refuses to bail out, he is confronted with iteratively more negative market scenarios 398 scenario and again he has the option to bail out 402. Depending on when the user selects to bail out 402, the system adjusts the user risk profile for that security type 404. The process is repeated for other types of investment such as Retirement, Tax deferred environment. At the end of this process, the automated coaching generates coaching to describe the user's risk tolerance profile at 406 and the process is completed at 407.

Figure 10:
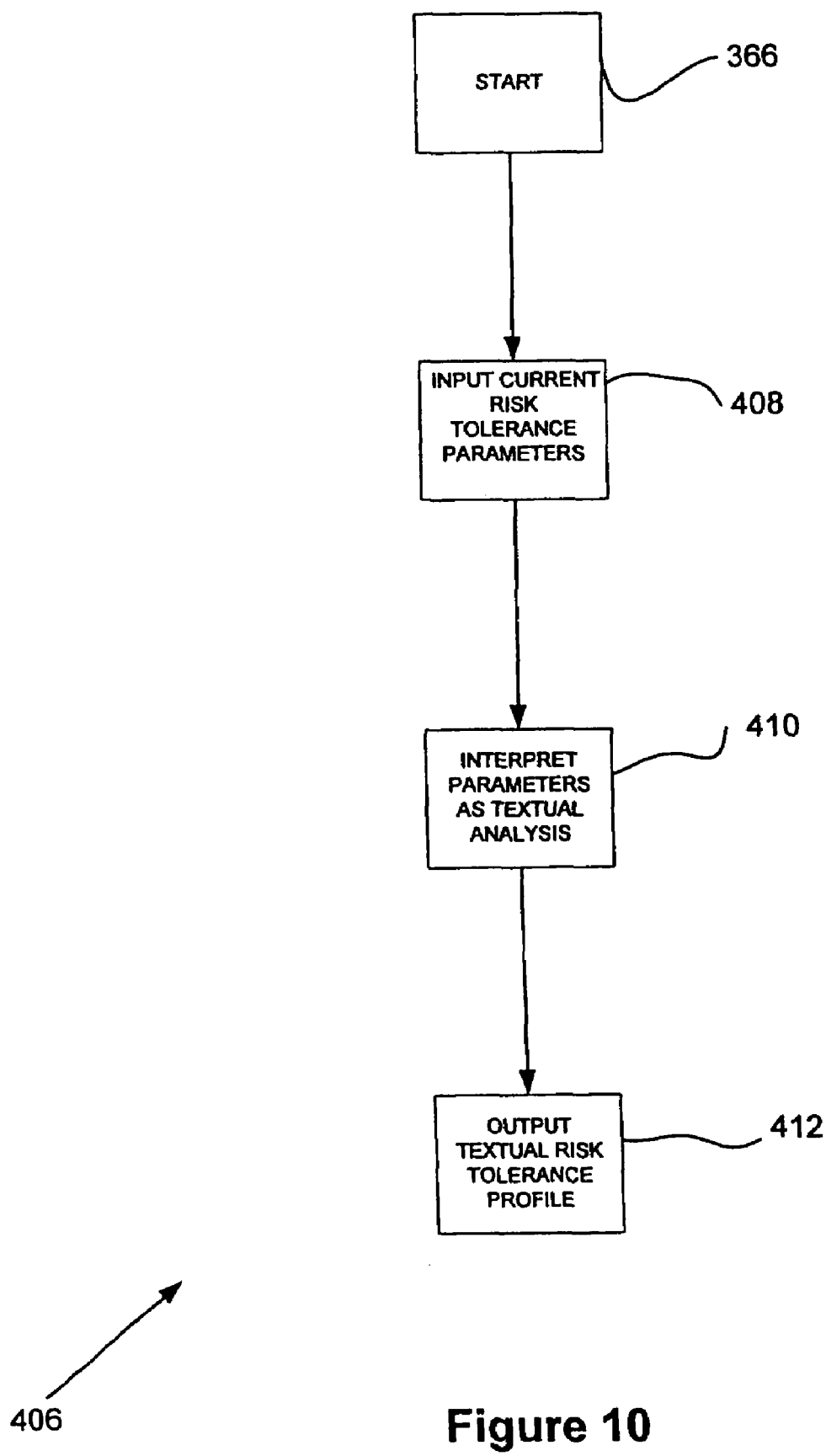
FIG. 10 is a flow diagram of an illustration of coaching generated related to the risk tolerance operation.

FIG. 10 is block diagram of the "generate coaching to describe risk profile" operation 406 of FIG. 9. After the user's risk tolerance is initially set, the risk tolerance parameters are fed to the coaching engine an operation 408. The coaching engine algorithm interprets the risk tolerance parameters and forms a textual analysis 410. The coaching engine presents to the user the resulting interpretation of the risk tolerance profile in a textual format 412 and the process is complete.

As an example, the coaching engine can explain in textual language, to the user the significance of the risk tolerance parameter and how the coaching engine would use this parameter to analyze the user's portfolio, and assess whether the existing portfolio conforms to the user's risk tolerance parameter. Furthermore, the coaching engine uses the risk tolerance parameter to suggest securities to be added to the user's portfolio to reduce its risk vulnerability. If the user is not happy with the result of the risk tolerance, the process 366 of FIG. 9 can be repeated.

The present invention preferably provides risk management and reporting capabilities for personal investment portfolios, e.g. stocks and bonds. The present invention allows customers to be able to quantify the risk associated with their equity holdings for the first time. Currently risk management for personal portfolios is based on judgment and intuition. The brokerage industry is currently facing a number of challenges and opportunities related to this. Too many optimistic self-directed investors are assuming levels of risk they are not aware of and cannot afford. As well, regulators are concerned about the lack of controls in the trading environment potentially resulting in widespread losses and liability litigation.

Figure 11:
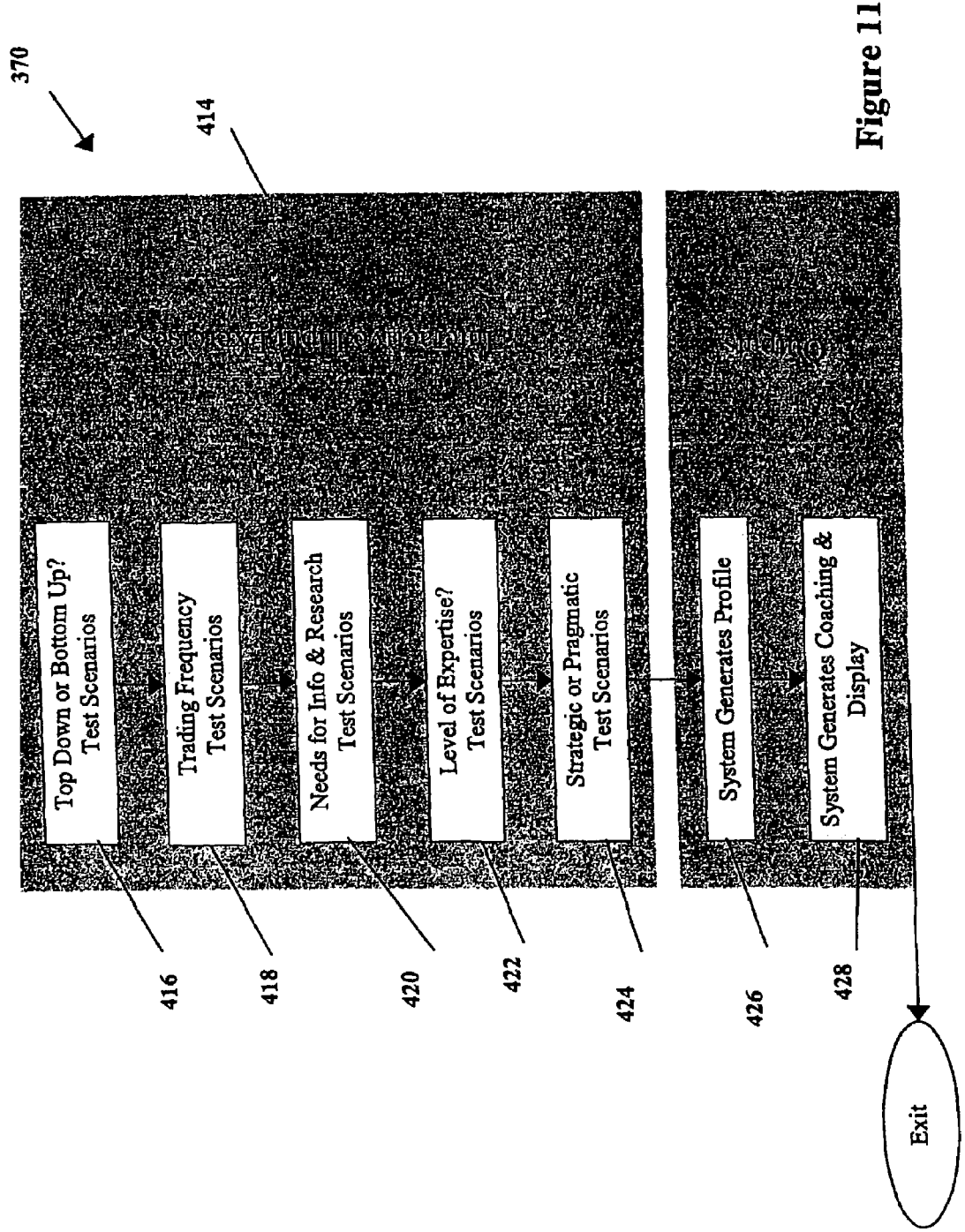
FIG. 11 is a flow diagram of how to set investment style operation in greater detail.

FIG. 11 illustrates a flow diagram for determining an investment style 370 in a network-based financial framework. The present technique is intended to not just ask questions, but provide scenarios. It sets up a portfolio of stocks that an investor can trade or not trade on these fictitious stocks, and provides examples of how the stock market can move. The present method develops a profile and helps target information effectively for the particular person. Coaching is strategically designed to keep the risk minimal by avoiding telling what someone should do. Scenarios will also identify areas of weakness in one's knowledge.

In one embodiment, the interactive input exercise may include top down or bottom up test scenarios 416, trading frequency test scenarios 418, needs for information and research test scenarios 420, level of expertise test scenarios 422, and/or strategic or pragmatic test scenarios 424. For example, a bottom up investor would start with a vision of the economy and decide what to invest in, and then they would look at one stock at a time and make a decision. Trading frequency is used by the system to project the user's portfolio performance in the future by taking into account trading cost. Level of expertise scenarios may be used to customize coaching strings and the level of explanation put forth by the automated coaching.

In use, an investment profile of the subject is generated based on the at least one interactive input exercise in operation 426. Coaching is also provided for the subject based on the generated investment profile. A display may be generated for the subject based on the generated investment profile. Note operation 428. In one embodiment of the present invention, the user may reject his investment style parameter as presented to him by the automated coaching and go through the process 370 to reset his investment style parameter.

Figure 12:
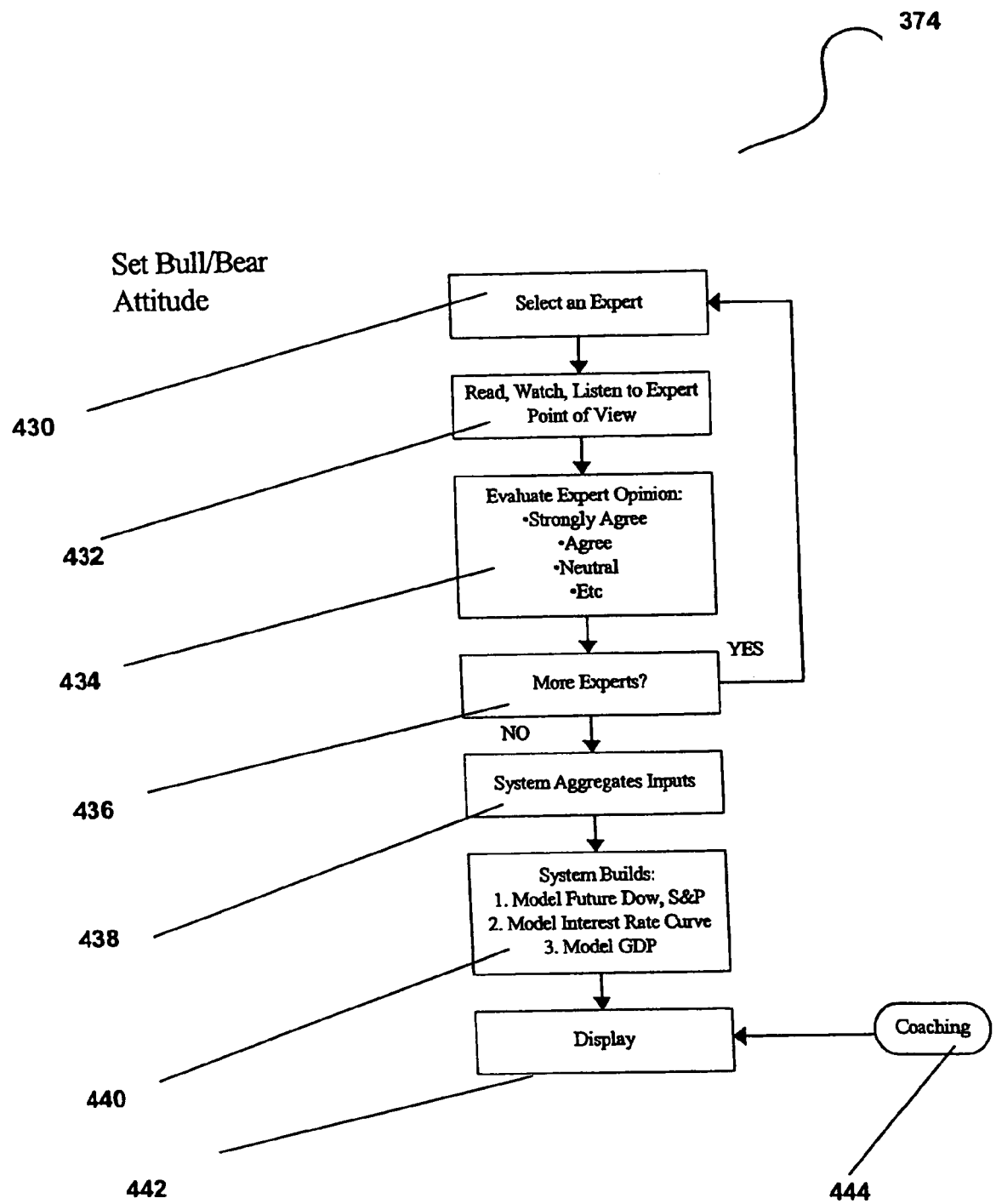
FIG. 12 is a flow diagram of how to set Bull/Bear attitude.

FIG. 12 illustrates a flow diagram for the "set Bull/Bear attitude" in operation 374. The instant aspect of the present invention is able to come to a conclusion about a person. For example, it may determine how confident a person is about the future. Online polling is one technique that allows the present invention to become the basis of a customer's long-term parameters. It achieves a systematic attempt to capture one's perspective on the economy as a whole. First, an expert is selected utilizing a network in operation 430.

Next, an opinion from the expert is rendered utilizing the network and witnessed in operation 432. At least one evaluation of the expert's opinion is then received from a subject utilizing the network. Note operation 434. As an option, the step of obtaining the evaluation may be accomplished by displaying to the subject a plurality of choices for expressing the subject's agreement with the opinion of the expert, receiving a selection of one of the choices from the subject utilizing the network, and storing the selection. In one aspect of the present invention, the plurality of choices displayed to the user may include the following: strongly agree with the opinion, agree with the opinion, neutral to the opinion, disagree with the opinion, and/or strongly disagree with the opinion.

In operation 436, the subject may be permitted to select at least one other expert utilizing the network after which operations 430-436 of the present invention may be repeated. The evaluation (s) may then be aggregated from one or more subjects, as indicated in operation 438.

Thereafter, in operation 440, at least one financial model may be built based on the aggregated evaluation from the subject. As an option, the financial model may be selected from a model based on the future of a financial index, a model based on an interest rate curve, and a model based on a gross domestic product (GDP). Further, the financial model is displayed in operation 442 utilizing the network. In one aspect of the present invention, the subject may be coached utilizing the network. See operation 444. Such coaching may be based on the financial model. The coaching would analyses the user's market attitude (bull/bear attitude) and explain the resulting market model in natural language. The resulting market attitude would be used by the modeling and coaching engines to project the user portfolio's growth over a period of time. Once the user has quantified his market attitude through operation 374, he presented coaching advice that includes the user's market attitude in all future analysis.

Figure 13:
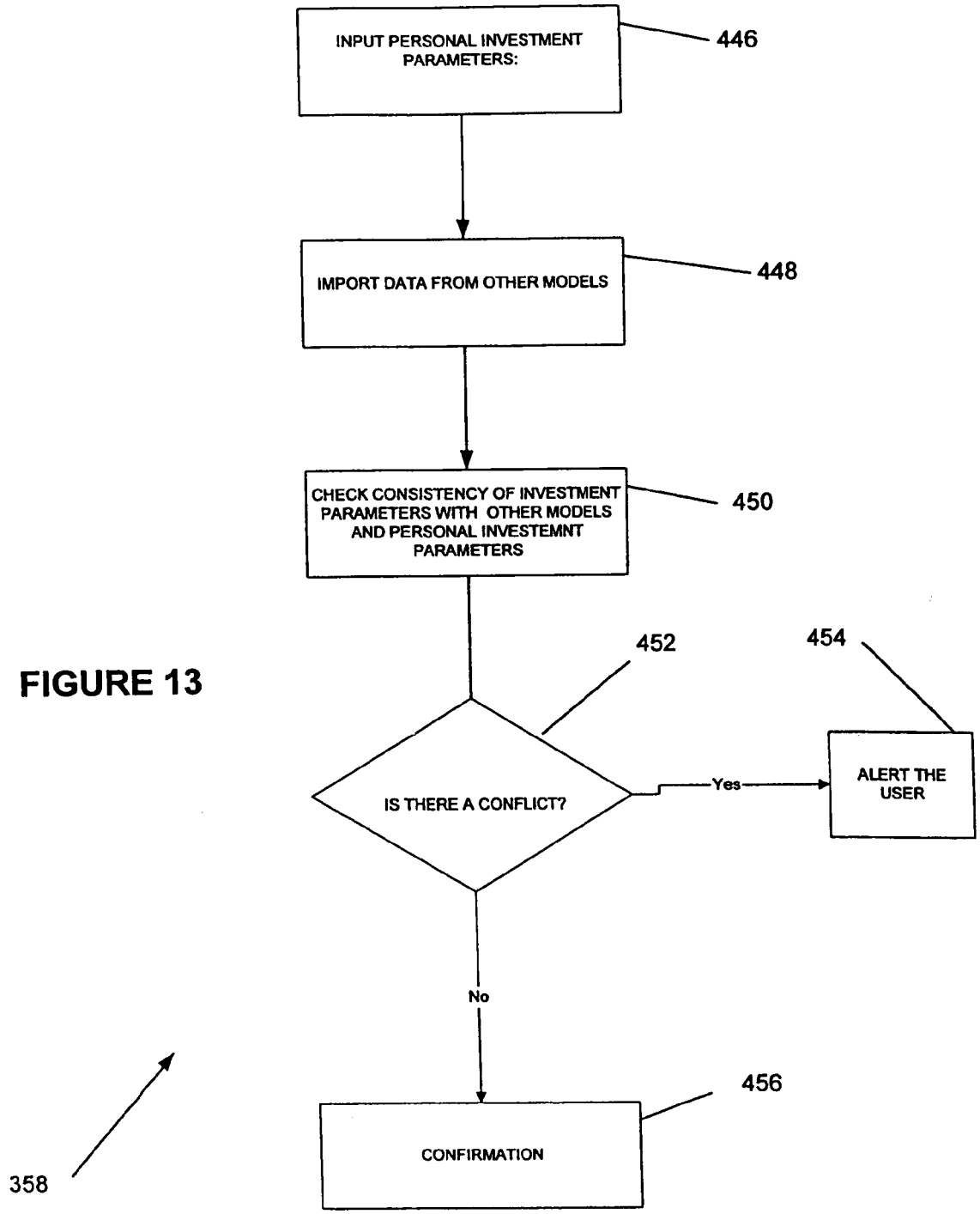
FIG. 13 is a flow diagram for setting personal financial parameters.

FIG. 13 represents the flow chart for setting the personal financial parameters 358. Once personal investment parameters have been identified, the user is prompted to input some basic personal financial parameters. Unlike the Personal Investment Parameters, which are largely qualitative, the Personal Financial Parameters 358 are quantitative.

First the user is prompted at 446 to input some basic financial data such as his time frame or his investment horizon, his target and current portfolio value and his planned rate of contribution to his investment portfolio. The user also preferably inputs such other personal parameters such as whether the portfolio is a tax exempt IRA, 401K or Canadian RRSP. Note operation 446. One important datum is the "floor." In a retirement portfolio this would be the bare minimum acceptable lifestyle the customer would be prepared to accept. Some of the data may be imported from other models such as the LifePath model 262. Note operation 448. The automated coaching engine checks for consistency of the personal financial parameters 358 with the LifePath model 262, and personal investment parameters 356. Note operation 450. If the consistency check yields a conflict 452, the user is alerted 454. If no conflict is detected then the coaching engine confirms the personal financial parameters 456.

A risk modeling algorithm is used for analysis and projects the portfolio value forward compounded at its current rate of growth. Surrounding the forecast line there is risk bands showing best and worst case scenarios given the aggregated volatility of all contained securities. The bands are preferably defined for example, by Bell curve theory and represent a sigma value related to the confidence level the customer requires in the forecast. The greater the confidence required, the wider the bands. If the "floor' value ends up within the bands, the customer is at risk of an unacceptable retirement. The customer can settle for less confidence in the portfolio projection. He may also optimize a portfolio that hits the target with lower risk using the automated coaching to guide him. He may further accept a lower target at lower risk and rebalance his portfolio. He may simply lower his "floor" or decide to increase his contribution. Once the user's personal investment parameters and user's personal financial parameters have been established, the system sets the asset mix 360.

Figure 14:
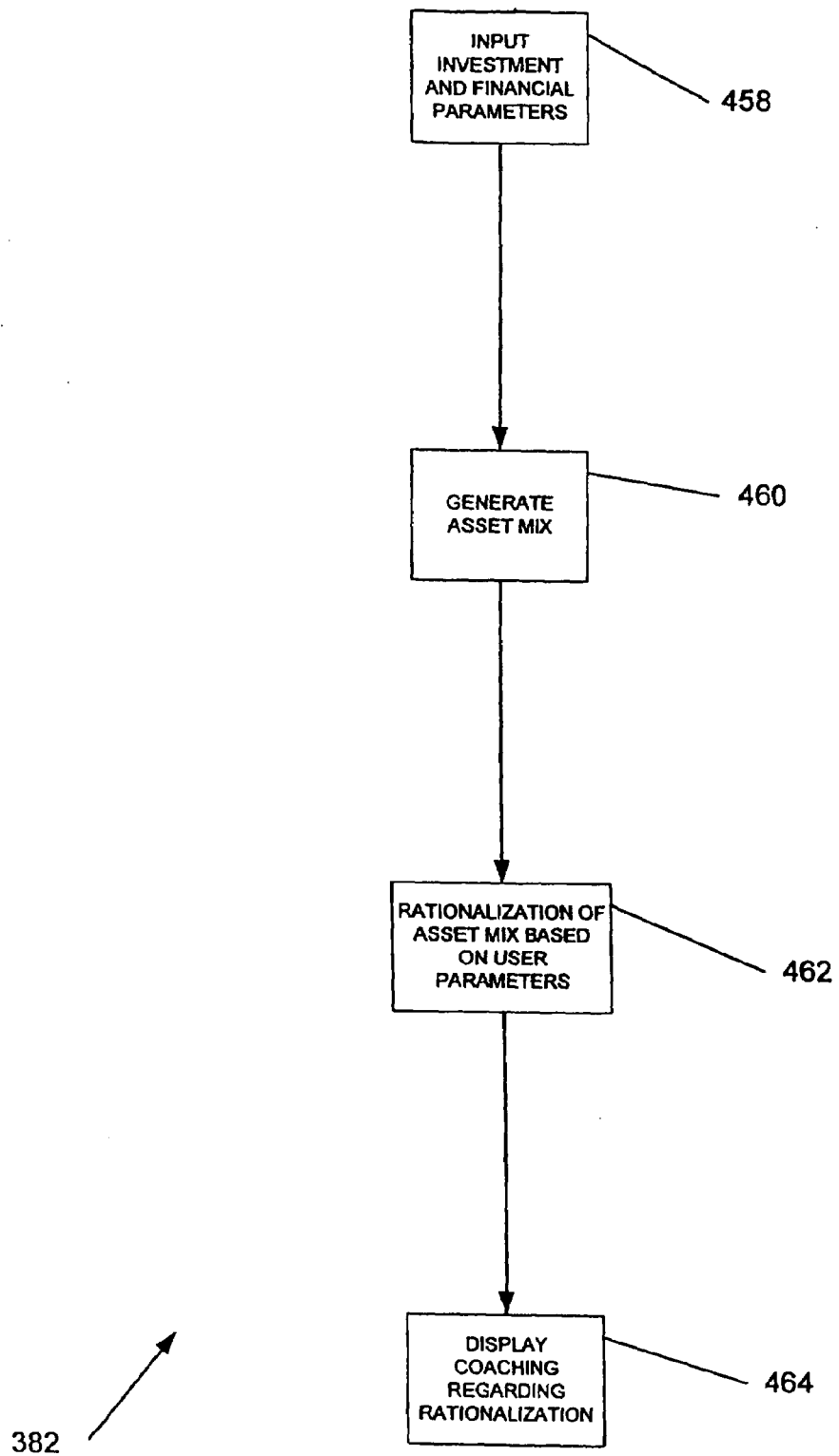
FIG. 14 is a flow diagram for computer generated setting of an asset mix.

FIG. 14 is a flow diagram for process of setting the asset mix coaching operation 382 of FIG. 8. First the automated coaching imports the user's personal investment parameters 356 and the user's personal financial parameters 358. Note operation 458. Next, the automated coaching creates a computer-generated asset mix based on the user's parameters and the user's parameters 460. As an example, the automated coaching taking into consideration the user's risk tolerance and investment style parameters, suggest a possible asset mix between stocks and bonds to achieve the user defined target portfolio. The automated coaching evaluates various parameters such as Value At Risk (VAR) and Beta value for the computer generated asset mix and evaluates these variables against the user's personal investment parameters 356 and the user's personal financial parameters 358. Note operation 462. The automated coaching outputs to the user the rationalization of the computer generated asset mix in textual natural language coaching strings 464.

The automated coaching helps the user achieve his financial goals by directing him to modify his portfolio to increase his return on investment and reduce his risk. Three portfolio tools use the personal and financial profile parameters as inputs. A tool is used to create a customized portfolio automatically. It creates an ideal proportional breakdown of security types based on the customer's personal and financial investment parameters. Creating a set of filters, it then selects appropriate securities of each type at the right level of risk and volatility, validates the aggregated growth and volatility, and iterates if necessary. The tool could be used by the customer or the modeling system on the customer's behalf by automatically analyzing the user's existing portfolio. Alternatively, a tool may be used to allow the customer to exchange securities in and out of his portfolio with guidance from the automated coaching system. Also, a tool may be used to generate a computer generated portfolio based on the user's investment parameters.

Figure 15:
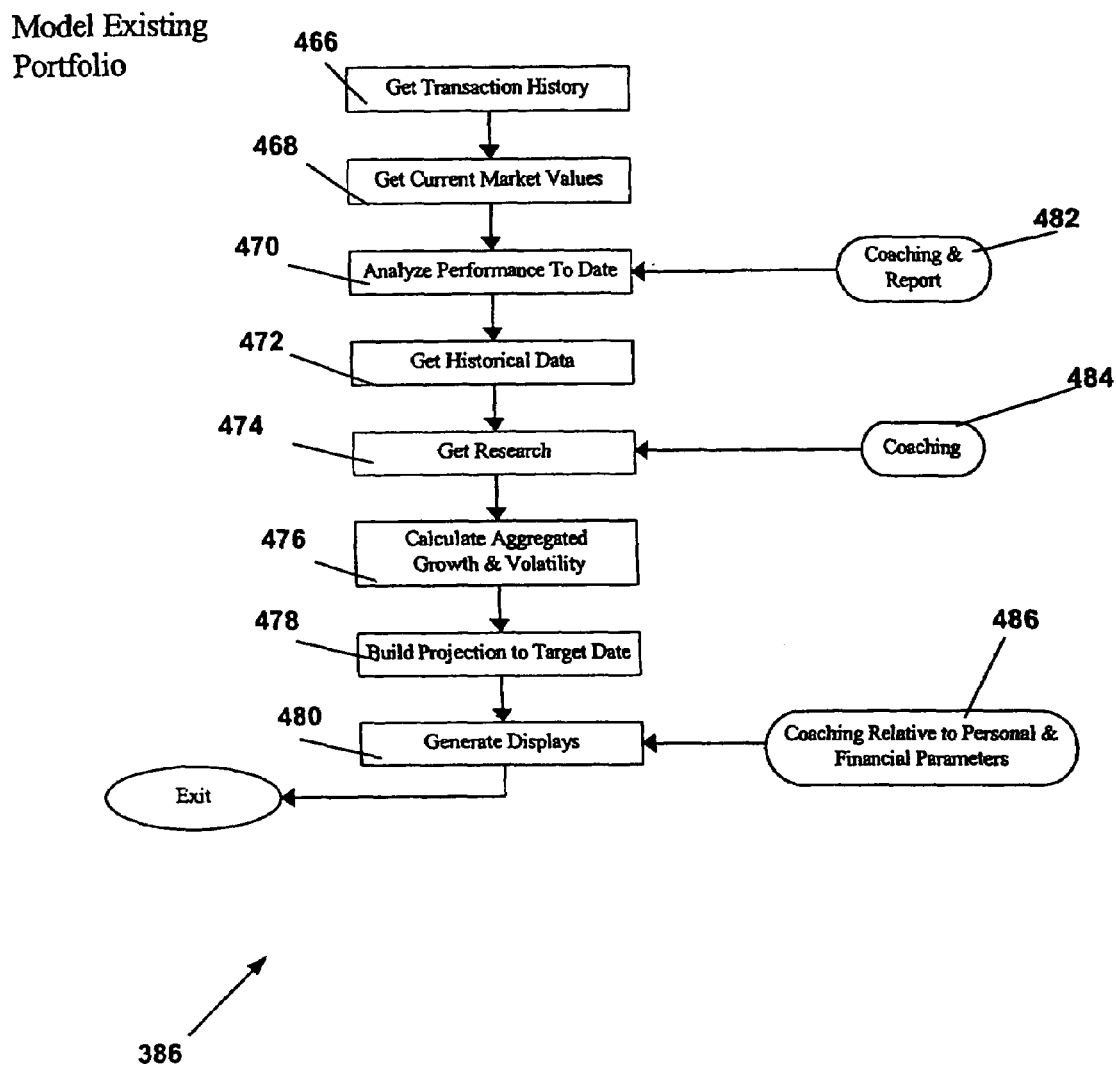
FIG. 15 is a flow diagram for modeling an existing portfolio.

FIG. 15 illustrates a flow diagram for modeling an existing financial portfolio 386 FIG. 8. First, the performance of at least one investment of a subject is determined utilizing a network. As shown, the performance of the investment includes obtaining a transaction history of the investment in operation 466, obtaining a current market value for the investment in operation 468, and analyzing the performance of the investment based on the transaction history and the current market value of the investment. Note operation 470. Next, financial information is obtained relating to the investment of the subject. The step of obtaining the financial information relating to the investment may include obtaining historical data on the investment in operation 472, and obtaining research relating to the historical data of the investment in operation 474.

With continuing reference to FIG. 15, the aggregated growth and volatility of the investment is calculated in operation 476. Such calculation may be performed based on bell curves, and other statistical techniques. Best case and worst case scenarios may also be produced.

A projection to a target date is subsequently built for the investment. Note operation 478. This is done based on the determined performance of the investment, the financial information relating to the investment, and/or the calculated aggregated grown and volatility of the investment. Finally, displays are generated based on the built projection. Note operation 480.

As shown in FIG. 15, coaching and a report 482 may be provided to the subject utilizing the network based on the determined performance of the investment. This may include comparing the user's portfolio to market benchmarks and pinpointing the source of the portfolio's volatility or underperformance, by sector or even by specific security. Further, coaching may be provided to the subject utilizing the network based on the obtained financial information relating to the investment. Note operation 484. Such network may also be used to provide coaching in operation 486 with the generated displays relative to personal and financial parameters of the subject.

Table 2 details the performance of the coaching engines in analyzing an existing portfolio.

parameters 356 and the user personal financial parameters 358. For example, securities with higher Value At Risk coefficient than the permissible user risk tolerance are rejected. Securities are selected from user preferred industry sectors such as electronics or transportation. The system obtains historical data, technical and fundamental data, and research and breaking news or expert opinion, all pertaining to the particular security 492. The coaching engine converts the data into natural language, non technical coaching strings 496. Automated coaching provides analyses of the technical and fundamental data and provides growth, risk and value analysis for each security selected 494. After the automated coaching output, the user may elect to do a "trial swap" of the security and observe the impact of the swap 498. The modeling system recalculates the portfolio model including the added securities and the subtracted securities. The system further does a risk compliance to meet the with the user's personal investment profile 500. Furthermore, the new portfolio's growth and volatility are analyzed by the system and the automated coaching engine translates the effect of the swap on the portfolio performance in non technical natural language 502. If the user is satisfied with the resulting swap he may accept it 504. If he is unsatisfied with the security swap, he may reject it 506. In one embodiment of the present invention, the user may place an order to purchase the particular security through the financial modeling system, using the network.

The various embodiments described above are provided by way of illustration only and should not be constructed to limit the invention. Those skilled in the art will readily recognize the various modifications and changes which may be made to the present invention without strictly following the exemplary embodiments illustrated and described herein, and without departing from the true spirit and scope of the present invention, which is set forth in the following claims.

TABLE 2

| Coach | Inputs | Algorithm | Outputs |
|---|---|---|---|
| Model Existing Portfolio: Analyze Performance to Date | Transaction history Current market values | Isolate market impact from sale/purchase impact Breakout by security type Calculate portfolio trends Calculate impact of fees, etc. | Analysis of market-related growth by security type, by sector Trend analysis Fee, service analysis Dividend & interest impact |
| Get Research | Market data feeds Expert analyst opinion | Convert raw data to syntactic textual analysis Integrate expert opinion (text) | Provide growth, risk & value analysis of current portfolio, for each security |
| Generate Display | Growth & volatility projection | Compare forecast to personal & financial parameters | Evaluation of portfolio relative to personal & financial parameters |

Once the user's present portfolio is analyses the automated coaching is used to rebalance the portfolio, and improve its performance.

Figure 16:
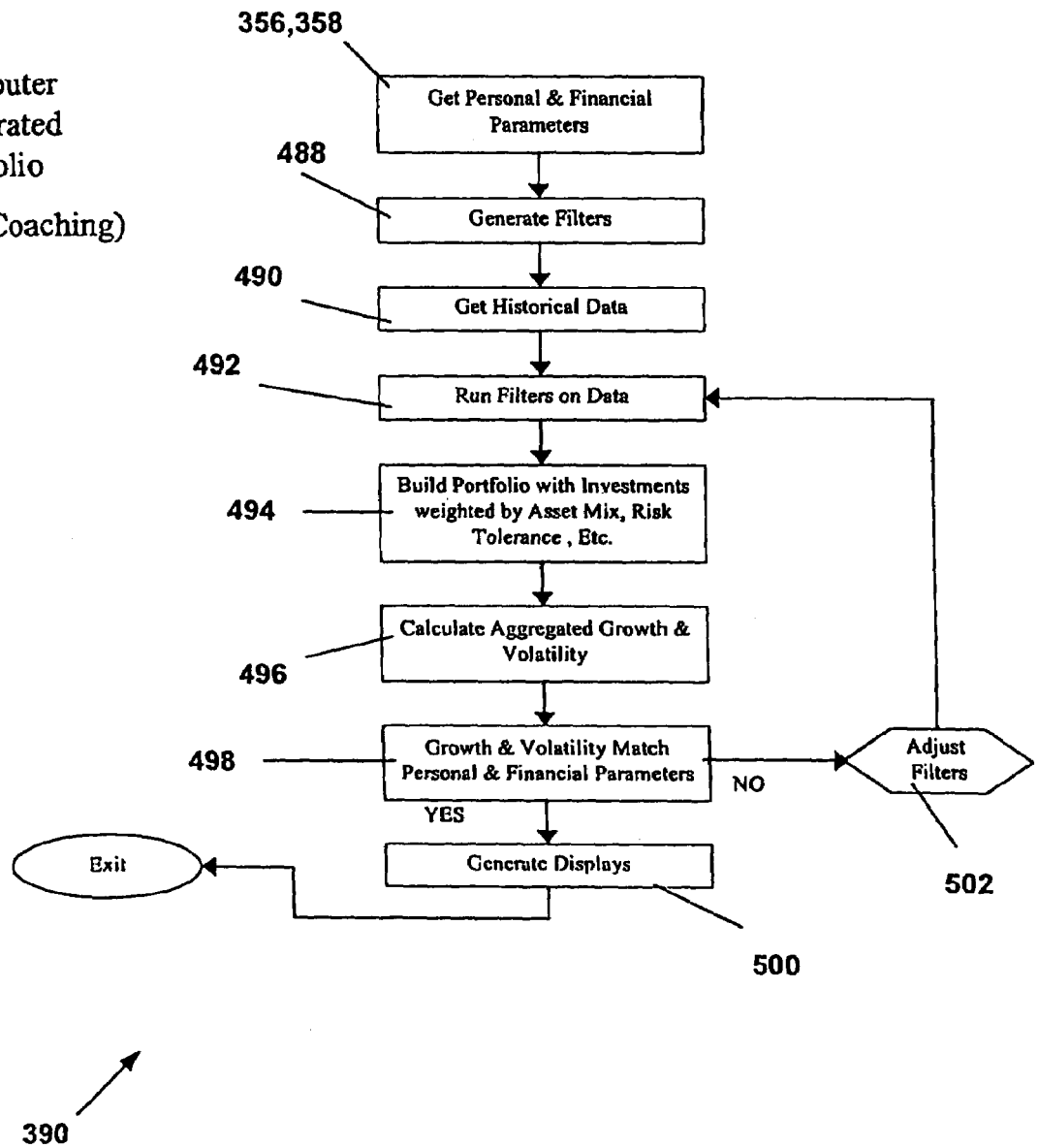
FIG. 16 is a flow diagram of how to rebalance a portfolio.

FIG. 16 illustrates a flow diagram of a process 392 of FIG. 8 to rebalance a portfolio with the aid of the automated coaching. In the first step the modeling system creates a portfolio model using either an existing portfolio or starts with a computer generated portfolio 448. Next the user selects security from the list of filtered securities for possible "swap" or exchange with securities already in the portfolio 490. The securities are filtered based on the user's personal investment

What is claimed is:

1. A computer-readable storage medium having computer-executable instructions to perform a method for providing automated coaching for a financial modeling and counseling system over a network to a user-investor, the method comprising:

inputting personal financial data of the user-investor;

inputting user preferences, the user preferences including risk tolerance;

inputting user financial goals;

inputting external financial market data;

processing the personal financial data, the external financial market data, the user preferences, and the user financial goals using automated rules-based coaching algorithms; and outputting to the user-investor in a natural language format:
- (a) automated coaching provided by an automated rules-based analysis, wherein the coaching includes financial advice based on the personal financial data, preferences, and financial goals of the user-investor;
- (b) a proposed product configuration formulated to comply with the user preferences and the user financial goals, wherein the proposed product configuration includes recommended securities for the user-investor to purchase from a larger set of securities;
- (c) a projection of an effect of the proposed product configuration on attaining the user financial goals through statistics presented with contextual language;
- (d) a rationalization of the proposed product configuration compared with the user preferences and financial goals parameters via textual coaching strings;
- (e) an explanation of risk potential based on the proposed product configuration and user risk tolerance parameters; and
- (f) a suggestion of securities to be added to the user-investor's portfolio to reduce risk vulnerability and allow the user to refine the proposed product configuration for conformance with the user-investor's risk tolerance.

2. The computer-readable storage medium claim 1, wherein part of the personal financial data includes an aggregate cash flow model, an investment target value, a target date for achieving financial user financial goals, or an investment portfolio.

3. The computer-readable storage medium claim 1, wherein the external financial market data includes values of various market benchmark indices, performance history of various securities, or prices of various securities.

4. The computer-readable storage medium claim 1, wherein the automated coaching advice in natural language format is an interpretation of numerical data.

5. The computer-readable storage medium claim 1, wherein the user preferences include a risk tolerance, an investment style, or a market attitudes.

6. The computer-readable storage medium claim 1, wherein the user goals include retirement, purchasing a house, purchasing a car, going on vacation, or paying for college.

7. The computer-readable storage medium claim 1, wherein the automated coaching advice provides live coaching over the network.

8. A system for providing automated coaching for a financial modeling and counseling system over a network to a user-investor, comprising:
- a database for receiving personal financial data of the user-investor;
- a database for receiving user preferences, the user preferences including risk tolerance;
- a database for receiving user goals;
- a database for receiving external financial market data;
- a processing unit for processing the personal financial data, the external financial market data, the user preferences, and the user financial goals using automated rules-based coaching algorithms; and
- a user interface for outputting to the user-investor in a natural language format:
  - (a) automated coaching provided by an automated rules-based analysis, wherein the coaching includes financial advice based on the personal financial data, preferences, and financial goals of the user-investor;
  - (b) a proposed product configuration formulated to comply with the user preferences and the user financial goals, wherein the proposed product configuration includes recommended securities for the user-investor to purchase from a larger set of securities;
  - (c) a projection of an effect of the proposed product configuration on attaining the user financial goals through statistics presented with contextual language;
  - (d) a rationalization of the proposed product configuration compared with the user preferences and financial goals parameters via textual coaching strings;
  - (e) an explanation of risk potential based on the proposed product configuration and user risk tolerance parameters; and
  - (f) a suggestion of securities to be added to the user-investor's portfolio to reduce risk vulnerability and allow the user to refine the proposed product configuration for conformance with the user-investor's risk tolerance.

9. The system of claim 8 wherein the personal financial data includes an aggregate cash flow model, an investment target value, a target date for achieving financial user financial goals, or an investment portfolio.

10. The system of claim 8 wherein the external financial market data includes values of various market benchmark indices, performance history of various securities, or prices of various securities.

11. The system of claim 8 wherein the automated coaching advice in natural language format is an interpretation of numerical data.

12. The system of claim 8 further including a user interface for providing live coaching over the network.

13. A computer-readable storage medium encoded with a computer program for providing automated coaching for a financial modeling and counseling system over a network to a user-investor, the computer program comprising:
- a code segment for inputting personal financial data of the user-investor;
- a code segment for inputting user preferences, the user preferences including risk tolerance;
- a code segment for inputting user goals;
- a code segment for inputting external financial market data;
- a code segment for processing the personal financial data, the external financial market data, the user preferences, and the user financial goals using automated rules-based coaching algorithms; and
- a code segment for outputting to the user-investor in a natural language format:
  - (a) automated coaching provided by an automated rules-based analysis, wherein the coaching includes financial advice based on the personal financial data, preferences, and financial goals of the user-investor;
  - (b) a proposed product configuration formulated to comply with the user preferences and the user financial goals, wherein the proposed product configuration includes recommended securities for the user-investor to purchase from a larger set of securities;
  - (c) a projection of an effect of the proposed product configuration on attaining the user financial goals through statistics presented with contextual language;
  - (d) a rationalization of the proposed product configuration compared with the user preferences and financial goals parameters via textual coaching strings;

(e) an explanation of risk potential based on the proposed product configuration and user risk tolerance parameters; and (f) a suggestion of securities to be added to the user-investor's portfolio to reduce risk vulnerability and allow the user to refine the proposed product configuration for conformance with the user-investor's risk tolerance.

14. The computer-readable storage medium of claim 13, wherein said personal financial data includes an aggregate cash flow model, an investment target value, a target date for achieving financial user financial goals, or an investment portfolio.

15. The computer-readable storage medium of claim 13, wherein the external financial market data includes values of various market benchmark indices, performance history of various securities, or prices of various securities.

16. The computer-readable storage medium of claim 13, wherein the automated coaching advice in natural language format is an interpretation of numerical data.

17. The computer-readable storage medium of claim 13, further comprising a user interface for providing live coaching over the network.

* * * * *

UNITED STATES PATENT AND TRADEMARK OFFICE
CERTIFICATE OF CORRECTION

| | | |
|---|---|---|
| PATENT NO. | : 7,783,545 B2 | Page 1 of 1 |
| APPLICATION NO. | : 09/976443 | |
| DATED | : August 24, 2010 | |
| INVENTOR(S) | : Ronald E. Sloan et al. | |

It is certified that error appears in the above-identified patent and that said Letters Patent is hereby corrected as shown below:

Title Page, Item 57, abstract, line 11, "system can analyses" should read --system can analyze--.

Claim 2, col. 21, line 30, "storage medium claim 1" should read --storage medium of claim 1--.

Claim 3, col. 21, line 35, "storage medium claim 1" should read --storage medium of claim 1--.

Claim 4, col. 21, line 40, "storage medium claim 1" should read --storage medium of claim 1--.

Claim 5, col. 21, line 43, "storage medium claim 1" should read --storage medium of claim 1--.

Claim 6, col. 21, line 46, "storage medium claim 1" should read --storage medium of claim 1--.

Claim 7, col. 21, line 50, "storage medium claim 1" should read --storage medium of claim 1--.

Signed and Sealed this

Twenty-third Day of November, 2010

David J. Kappos
*Director of the United States Patent and Trademark Office*